US011492468B2

(12) United States Patent
Biswas et al.

(10) Patent No.: US 11,492,468 B2
(45) Date of Patent: Nov. 8, 2022

(54) POLYETHYLENE COMPOSITIONS

(71) Applicant: Dow Global Technologies LLC, Midland, MI (US)

(72) Inventors: Sanjib Biswas, Manvel, TX (US); Alexander Williamson, Rosharon, TX (US); Jorge Caminero Gomes, Sao Paulo (BR); Carol Tsai, Lake Jackson, TX (US)

(73) Assignee: Dow Technologies LLC, Midland, MI (US)

( * ) Notice: Subject to any disclaimer, the term of this patent is extended or adjusted under 35 U.S.C. 154(b) by 125 days.

(21) Appl. No.: 16/984,765

(22) Filed: Aug. 4, 2020

(65) Prior Publication Data

US 2021/0040295 A1 Feb. 11, 2021

Related U.S. Application Data

(60) Provisional application No. 63/017,792, filed on Apr. 30, 2020, provisional application No. 62/883,467, filed on Aug. 6, 2019.

(51) Int. Cl.
*C08L 23/06* (2006.01)
*C08K 5/14* (2006.01)

(52) U.S. Cl.
CPC ............. *C08L 23/06* (2013.01); *C08K 5/14* (2013.01); *C08L 2310/00* (2013.01)

(58) Field of Classification Search
CPC ............. C08L 23/0815; C08L 23/06; C08L 2205/025; C08K 5/14
See application file for complete search history.

(56) References Cited

U.S. PATENT DOCUMENTS

| | | |
|---|---|---|
| 3,003,000 A | 10/1961 | Milas |
| 3,645,992 A | 2/1972 | Elston |
| 3,914,342 A | 10/1975 | Mitchell |
| 4,076,698 A | 2/1978 | Anderson et al. |
| 5,272,236 A | 12/1993 | Lai et al. |
| 5,278,272 A | 1/1994 | Lai et al. |
| 5,582,923 A | 12/1996 | Kale et al. |
| 5,733,155 A | 3/1998 | Sagawa |
| 5,854,045 A | 12/1998 | Fang et al. |
| 6,582,828 B1 | 6/2003 | Kaschel |
| 9,242,431 B2 | 1/2016 | Cruz et al. |
| 9,505,508 B2 | 11/2016 | Berbert |
| 9,631,059 B2 | 4/2017 | Demirors et al. |
| 9,688,795 B2 | 6/2017 | Cerk et al. |
| 2004/0241483 A1 | 12/2004 | Farley et al. |
| 2012/0100356 A1 | 4/2012 | Ohlsson et al. |
| 2014/0134302 A1 | 5/2014 | Hodge |
| 2014/0255674 A1 | 9/2014 | Tice et al. |
| 2015/0360450 A1 | 12/2015 | Barbaroux et al. |
| 2018/0051704 A1 | 2/2018 | Kihara et al. |
| 2018/0155474 A1 | 6/2018 | Holtcamp et al. |
| 2019/0100644 A1* | 4/2019 | Williamson ............ C08L 23/06 |
| 2019/0225786 A1* | 7/2019 | Yang .................. C08L 23/0815 |
| 2020/0239673 A1* | 7/2020 | Ssubramaniam ....... B29C 49/04 |

FOREIGN PATENT DOCUMENTS

| | | |
|---|---|---|
| CA | 2897575 A1 | 7/2014 |
| EP | 1935909 A1 | 6/2008 |
| EP | 2177548 A1 | 4/2010 |
| EP | 2348057 A1 | 7/2011 |
| EP | 2653392 B2 | 10/2015 |
| EP | 2106421 B2 | 6/2016 |
| JP | 2015074197 A | 4/2015 |
| JP | 2016051398 A | 4/2016 |
| JP | 2017061123 A | 3/2017 |
| WO | 9947601 | 9/1999 |
| WO | 1999047601 | 9/1999 |
| WO | 2005023912 A2 | 3/2005 |
| WO | 2005111291 A1 | 11/2005 |
| WO | 2007045415 A1 | 4/2007 |
| WO | 2007095667 A1 | 8/2007 |

(Continued)

OTHER PUBLICATIONS

International Search Report and Written Opinion dated Oct. 8, 2020 for PCT/US2020/044856 Filed Aug. 4, 2020. pp. 1-13.
International Search Report and Written Opinion dated Oct. 15, 2020 for PCT/US2020/044857 Filed Aug. 4, 2020. pp. 1-12.
International Search Report and Written Opinion dated Oct. 12, 2020 for PCT/US2020/044862 Filed Aug. 4, 2020. pp. 1-12.
International Search Report and Written Opinion dated Oct. 13, 2020 for PCT/US2020/044860 Filed Aug. 4, 2020. pp. 1-12.
International Search Report and Written Opinion dated Oct. 8, 2020 for PCT/US2020/044863 Filed Aug. 4, 2020. pp. 1-13.
International Search Report and Written Opinion dated Oct. 14, 2020 for PCT/US2020/044864 Filed Aug. 4, 2020. pp. 1-13.
International Preliminary Report on Patentability dated Feb. 8, 2022, pertaining to EP Patent Application No. 20761662.4, 6 pgs.
161/162 Communication dated Mar. 15, 2022, pertaining to EP Patent Application No. 20761662.4, 3 pgs.

(Continued)

*Primary Examiner* — Jeffrey C Mullis
(74) *Attorney, Agent, or Firm* — Dinsmore & Shohl LLP

(57) ABSTRACT

According to at least one embodiment of the present disclosure, polyethylene formulations and modified polyethylene compositions are provided. Embodiments of the polyethylene formulation may include a free radical generator; and a multimodal polyethylene composition. The multimodal polyethylene composition may include a peak in a temperature range of 95° C. to 120° C. in the elution profile via improved comonomer composition distribution (iCCD), wherein a polyethylene fraction area is an area in the elution profile beneath the peak of the polyethylene fraction between 95° C. and 120° C., and wherein the polyethylene fraction area comprises at least 20% of the total area of the elution profile and a molecular weight ($M_w$) of less than 80,000 g/mol in the temperature range of from 95° C. to 120° C. on an elution profile via iCCD. The modified polyethylene composition may be the reaction product of the free radical generator and the multimodal polyethylene composition.

15 Claims, 4 Drawing Sheets

(56) References Cited

FOREIGN PATENT DOCUMENTS

| | | |
|---|---|---|
| WO | 2008089978 A1 | 7/2008 |
| WO | 2008124557 A1 | 10/2008 |
| WO | 2010034463 A1 | 4/2010 |
| WO | 2010047709 A1 | 4/2010 |
| WO | 2011019563 A1 | 2/2011 |
| WO | 2012003042 A1 | 1/2012 |
| WO | 2013087531 A1 | 6/2013 |
| WO | 2014051682 A1 | 4/2014 |
| WO | 2015200743 A1 | 12/2015 |
| WO | 2016025168 A1 | 2/2016 |
| WO | 2016145550 A1 | 9/2016 |
| WO | 2016196168 A1 | 12/2016 |
| WO | 2017040127 A1 | 3/2017 |
| WO | 2017097573 A1 | 6/2017 |
| WO | 2017155609 A1 | 9/2017 |
| WO | 2017172273 A1 | 10/2017 |
| WO | 2018002196 A1 | 1/2018 |
| WO | 2018106480 A1 | 6/2018 |
| WO | 2018172510 A1 | 9/2018 |
| WO | 2019070440 B2 | 4/2019 |

OTHER PUBLICATIONS

161/162 Communication dated Mar. 15, 2022, pertaining to EP Patent Application No. 20758398.0, 3 pgs.
International Preliminary Report on Patentability dated Feb. 8, 2022, pertaining to EP Patent Application No. 20758398.0, 6 pgs.
Milas et al., "Studies in Organic Peroxides XXV Preparation, Separation and Identification of Peroxides Derived from Methyl Ethyl Ketone and Hydrogen Peroxide," A., J. Am. Chem. Soc, vol. 81, pp. 5824-5826 (1959).

\* cited by examiner

POLYETHYLENE COMPOSITIONS

CROSS-REFERENCE TO RELATED APPLICATIONS

This application claims priority to U.S. Provisional Patent Application Ser. No. 63/017,792 filed Apr. 30, 2020, and 62/883,467 filed Aug. 6, 2019, which are incorporated by reference in their entireties.

TECHNICAL FIELD

Embodiments described herein generally relate to polymer compositions and, more specifically, relate to polyethylene compositions and methods of producing the same.

BACKGROUND

Monolayer and multilayer polymer films may include blown or cast films. Generally, a composition's processability may be a function of the melt index of the composition. A higher melt index results in reduced bubble stability, and a lower melt index improves bubble stability. However, a lower melt index makes extrudability more difficult, for example, because such compositions require a higher extrusion pressure.

BRIEF SUMMARY

For blown film applications, easier extrudability and maximum bubble stability are critical processing needs for film converters to maximize output rate. Therefore, there are needs for polyethylene compositions that provide a balance of lower viscosities at higher shear rates for easier processability and higher melt strengths at the lower shear rates to enhance film bubble stability during the fabrication. The presently-disclosed polyethylene compositions meet these needs by providing films with a combination of a multimodal polyethylene composition and free radical generator to provide easier extrudability and improved bubble stability for blown film applications.

The instant application discloses polyethylene compositions suitable for packaging applications, films, multilayer structures, and packaging articles made therefrom. In embodiments, the presently-disclosed polyethylene compositions are suitable for use as blown film packaging applications.

According to at least one embodiment of the present disclosure, a polyethylene formulation is provided. Embodiments of the polyethylene formulation may include a free radical generator; and a multimodal polyethylene composition. The multimodal polyethylene composition may include a peak in a temperature range of 95° C. to 120° C. in the elution profile via improved comonomer composition distribution (iCCD) analysis method, wherein a polyethylene fraction area is an area in the elution profile beneath the peak of the polyethylene fraction between 95° C. and 120° C., and wherein the polyethylene fraction area comprises at least 20% of the total area of the elution profile and a molecular weight ($M_w$) of less than 80,000 g/mol in the temperature range of from 95° C. to 120° C. on an elution profile via iCCD analysis method. The multimodal polyethylene composition has a density of from 0.924 g/cm$^3$ to 0.936 g/cm$^3$ and a melt index ($I_2$) of from 0.25 grams/10 minutes (g/10 min) to 2.0 g/10 min.

According to at least one embodiment of the present disclosure, a modified polyethylene composition is provided. Embodiments of the modified polyethylene composition may include a peak in a temperature range of 95° C. to 120° C. in the elution profile via improved comonomer composition distribution (iCCD) analysis method, wherein a polyethylene fraction area is an area in the elution profile beneath the peak of the polyethylene fraction between 95° C. and 120° C., and wherein the polyethylene fraction area comprises at least 20% of the total area of the elution profile; and a molecular weight ($M_w$) of less than 80,000 g/mol in the temperature range of from 95° C. to 120° C. on an elution profile via iCCD analysis method. The modified polyethylene composition may have a viscosity of less than 600 Pa·s, when measured at a frequency of 500 rad/s.

According to at least one embodiment of the present disclosure, a modified polyethylene composition is provided. Embodiments of the polyethylene formulation may include a free radical generator and a multimodal polyethylene composition. The multimodal polyethylene composition may include (a) a first polyethylene fraction having a single peak in a temperature range of 45° C. to 87° C. in an elution profile via improved comonomer composition distribution (iCCD) analysis method, wherein a first polyethylene fraction area is an area in the elution profile beneath the single peak of the first polyethylene fraction between 45 and 87° C.; and (b) a second polyethylene fraction having a single peak in a temperature range of 95° C. to 120° C. in the elution profile via iCCD analysis method and wherein a second polyethylene fraction area is an area in the elution profile beneath the single peak of the second polyethylene fraction between 95° C. and 120° C.

These and other embodiments are described in more detail in the following Detailed Description.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
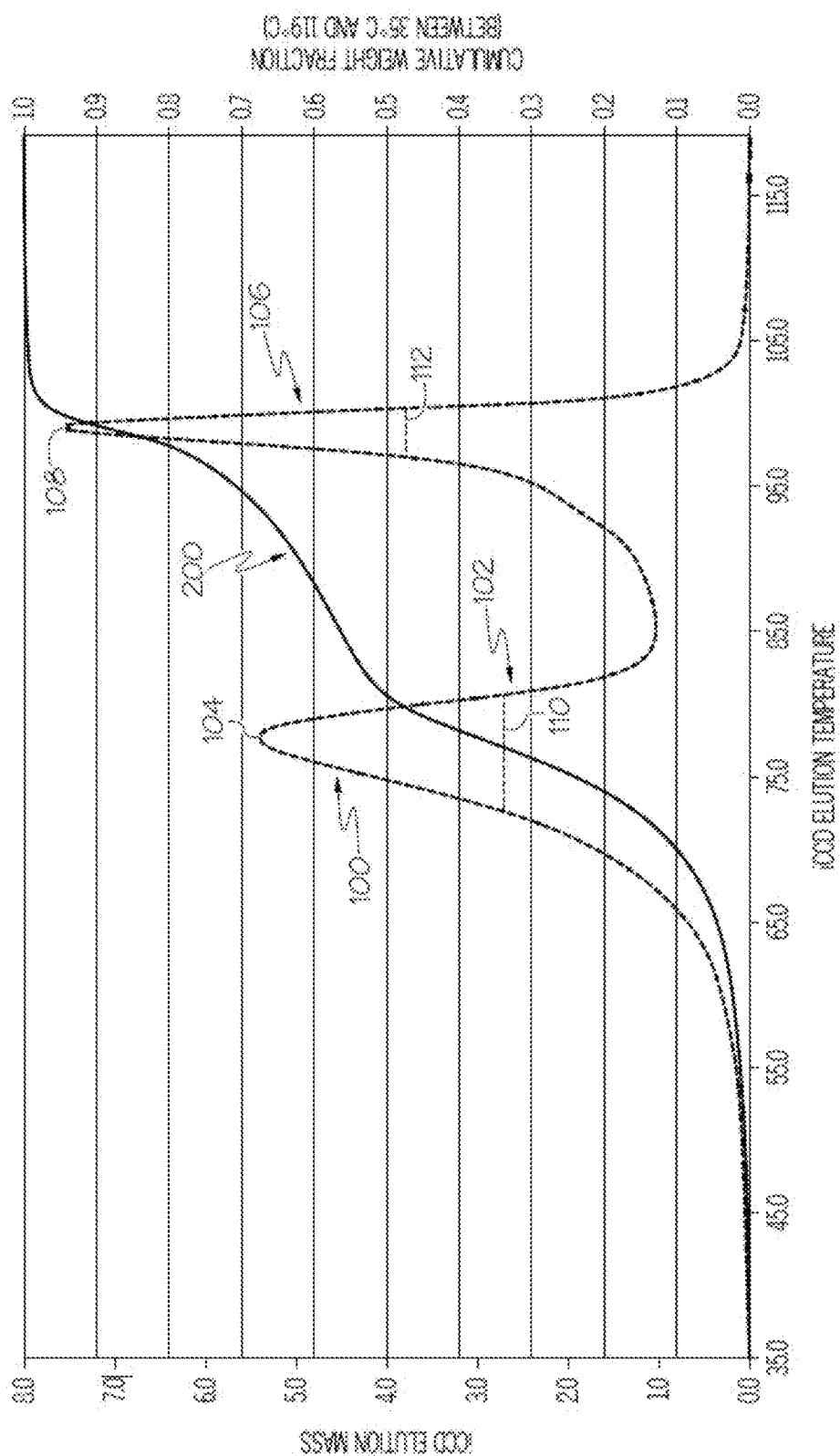
FIG. 1 graphically depicts the elution profile of a multimodal polyethylene composition, according to one or more embodiments presently described.

Described herein are embodiments of modified polyethylene compositions. Such modified polyethylene compositions can be used, for example, in packaging applications. In embodiments, the modified polyethylene compositions is the reaction product of a polyethylene formulation that may include a multimodal polyethylene composition and a free radical generator. The multimodal polyethylene composition may include a first polyethylene fraction, a second polyethylene fraction, and a third polyethylene fraction. The modified polyethylene composition may be included in a film (including monolayer films and multilayer films) or other articles such as multilayer structures and packages. In particular, the modified polyethylene composition may be included in a blown film.

As described herein, a "polyethylene" or "ethylene-based polymer" refers to polymers comprising a majority amount (>50 mol %) of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); ethylene-based plastomers (POP) and ethylene-based elastomers (POE); Medium Density Polyethylene (MDPE); and High Density Polyethylene (HDPE). These polyethylene materials are generally known in the art; however, the following descriptions may be helpful in understanding the differences between some of these different polyethylene resins.

The term "composition," as used herein, refers to a mixture of materials which comprises the composition, as well as reaction products and decomposition products formed from the materials of the composition.

The term "LDPE" may also be referred to as "high pressure ethylene polymer" or "highly branched polyethylene" and may be defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems and chromium-based catalyst systems as well as single-site catalysts, including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.924 to 0.936 g/cm$^3$. "MDPE" is typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts and polyvalent aryloxyether catalysts (typically referred to as bisphenyl phenoxy).

The term "HDPE" refers to polyethylenes having densities greater than about 0.935 g/cm$^3$ and up to about 0.980 g/cm$^3$, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 to 0.912 g/cm$^3$, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers. Polyethylene (ethylene-based) elastomers or plastomers generally have densities of 0.855 to 0.912 g/cm$^3$.

"Blend," "polymer blend," and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those skilled in the art.

Unless stated to the contrary, implicit from the context, or customary in the art, all parts and percent values are based on weight, all temperatures are in ° C., and all test methods are current as of the filing date of this disclosure.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. The term "consisting of" excludes any component, step or procedure not specifically delineated or listed.

Modified Polyethylene Composition

As stated previously herein, embodiments of the modified polyethylene compositions provided herein may be the reaction product of a polyethylene formulation including a multimodal polyethylene composition, subsequently described in more detail, and a free radical generator, subsequently described in more detail.

The modified polyethylene composition may be included in a film (including monolayer films and multilayer films) or other articles such as multilayer structures and packages. In particular, the modified polyethylene composition may be included in a blown film.

In one or more embodiments, the modified polyethylene composition may have a density of 0.924 g/cm$^3$ to 0.936 g/cm$^3$. For example, embodiments of the presently-disclosed modified polyethylene compositions may have densities of from 0.924 g/cm$^3$ to 0.934 g/cm$^3$, from 0.924 g/cm$^3$ to 0.932 g/cm$^3$, from 0.924 g/cm$^3$ to 0.930 g/cm$^3$, from 0.924 g/cm$^3$ to 0.928 g/cm$^3$, from 0.924 g/cm$^3$ to 0.926 g/cm³, from 0.926 g/cm³ to 0.936 g/cm³, from 0.926 g/cm³ to 0.934 g/cm³, from 0.926 g/cm³ to 0.932 g/cm³, from 0.926 g/cm³ to 0.930 g/cm³, from 0.926 g/cm³ to 0.928 g/cm³, from 0.928 g/cm³ to 0.936 g/cm³, from 0.928 g/cm³ to 0.934 g/cm³, from 0.928 g/cm³ to 0.932 g/cm³, from 0.928 g/cm³ to 0.930 g/cm³, from 0.930 g/cm³ to 0.936 g/cm³, from 0.930 g/cm³ to 0.934 g/cm³, from 0.930 g/cm³ to 0.932 g/cm³, from 0.932 g/cm³ to 0.936 g/cm³, from 0.932 g/cm³ to 0.934 g/cm³, from 0.934 g/cm³ to 0.936 g/cm³, or any combination of these ranges.

In one or more embodiments, the modified polyethylene composition may have a melt index ($I_2$) of 0.50 g/10 minutes to 1.6 g/10 minutes. For example, in one or more embodiments, the modified polyethylene composition may have a melt index ($I_2$) of from 0.5 g/10 minutes to 1.4 g/10 minutes, from 0.5 g/10 minutes to 1.2 g/10 minutes, from 0.5 g/10 minutes to 1.0 g/10 minutes, from 0.5 g/10 minutes to 0.8 g/10 minutes, from 0.5 g/10 minutes to 0.6 g/10 minutes, from 0.6 g/10 minutes to 1.6 g/10 minutes, from 0.6 g/10 minutes to 1.4 g/10 minutes, from 0.6 g/10 minutes to 1.2 g/10 minutes, from 1.0 g/10 minutes to 3.0 g/10 minutes, from 1.0 g/10 minutes to 2.0 g/10 minutes, from 0.6 g/10 minutes to 1.0 g/10 minutes, from 0.6 g/10 minutes to 0.8 g/10 minutes, from 0.8 g/10 minutes to 1.6 g/10 minutes, from 0.8 g/10 minutes to 1.4 g/10 minutes, from 0.8 g/10 minutes to 1.2 g/10 minutes, from 0.8 g/10 minutes to 1.0 g/10 minutes, from 1.0 g/10 minutes to 1.6 g/10 minutes, from 1.0 g/10 minutes to 1.4 g/10 minutes, from 1.0 g/10 minutes to 1.2 g/10 minutes, from 1.2 g/10 minutes to 1.6 g/10 minutes, from 1.2 g/10 minutes to 1.4 g/10 minutes, from 1.4 g/10 minutes to 1.6 g/10 minutes, or any combination of these ranges.

In one or more embodiments, the modified polyethylene composition may have a molecular weight distribution (MWD), expressed as the ratio of the weight average molecular weight to number average molecular weight ($M_{w(GPC)}/M_{n(GPC)}$), in the range of from 2.0 to 12.0, from 2.0 to 12.0, from 2.0 to 11.0, from 2.0 to 10.0, from 2.0 to 9.0, from 2.0 to 8.0, from 2.0 to 7.0, from 2.0 to 6.0, from 2.0 to 5.0, from 2.0 to 4.0, from 2.0 to 3.0, from 3.0 to 12.0, from 3.0 to 11.0, from 3.0 to 10.0, from 3.0 to 9.0, from 3.0 to 8.0, from 3.0 to 7.0, from 3.0 to 6.0, from 3.0 to 5.0, from 3.0 to 4.0, from 4.0 to 12.0, from 4.0 to 11.0, from 4.0 to 10.0, from 4.0 to 9.0, from 4.0 to 8.0, from 4.0 to 7.0, from 4.0 to 6.0, from 4.0 to 5.0, from 5.0 to 12.0, from 5.0 to 11.0, from 5.0 to 10.0, from 5.0 to 9.0, from 5.0 to 8.0, from 5.0 to 7.0, from 5.0 to 6.0, from 6.0 to 12.0, from 6.0 to 11.0, from 6.0 to 10.0, from 6.0 to 9.0, from 6.0 to 8.0, from 6.0 to 7.0, from 7.0 to 12.0, from 7.0 to 11.0, from 7.0 to 10.0, from 7.0 to 9.0, from 7.0 to 8.0, from 8.0 to 12.0, from 8.0 to 11.0, from 8.0 to 10.0, from 8.0 to 9.0, from 9.0 to 12.0, from 9.0 to 11.0, from 9.0 to 10.0, from 10.0 to 12.0, from 10.0 to 11.0, from 11.0 to 12.0, or any combination of these ranges. As presently described, the molecular weight distribution may be calculated according to gel permeation chromatography (GPC) techniques as described herein.

In one or more embodiments, the modified polyethylene composition may have a zero shear viscosity ratio of less than 2.0, when measured according to the test methods described herein. In embodiments, the modified polyethylene composition may have a zero shear viscosity ratio of from 1.0 to 2.0, from 1.0 to 1.5, from 1.5 to 2.0, or any combination of these ranges.

In embodiments, the modified polyethylene composition may have a z-average molecular weight ($M_{z(GPC)}$) of at least 250,000 g/mol when measured by light-scattering GPC techniques as described herein. In embodiments, the modified polyethylene composition may have a z-average molecular weight ($M_{z(GPC)}$) of from 250,000 g/mol to 10,000,000 g/mol, from 250,000 g/mol to 5,000,000 g/mol, from 250,000 g/mol to 1,000,000 g/mol, from 250,000 g/mol to 500,000 g/mol, from 500,000 g/mol to 10,000,000 g/mol, from 500,000 g/mol to 5,000,000 g/mol, from 500,000 g/mol to 1,000,000 g/mol, from 1,000,000 g/mol to 10,000,000 g/mol, from 1,000,000 g/mol to 5,000,000 g/mol, from 5,000,000 g/mol to 10,000,000 g/mol, or any combination of these ranges.

In embodiments, the modified polyethylene composition may have a $M_{z(GPC)}/M_{w(GPC)}$ of from 2.5 to 20 when measured by light-scattering GPC. In embodiments, the modified polyethylene composition may have a $M_{z(GPC)}/M_w$ of from 2.5 to 20, from 2.5 to 15, from 2.5 to 10, from 2.5 to 5, from 5 to 20, from 5 to 15, from 5 to 10, from 10 to 20, from 10 to 15, from 15 to 20, or any combination of these ranges, when measured by light-scattering GPC techniques as described herein.

In one or more embodiments, the modified polyethylene composition may have a ratio of viscosities of greater than 20, when measured using the DMS frequency swap test methods described herein. As used herein, "ratio of viscosities" refers to a ratio of the viscosity at 0.1 rad/sec per 500 rad/sec, when measured using the DMS frequency swap test methods described herein. In embodiments, the modified polyethylene composition may have a ratio of viscosities of greater than 20, greater than 30, greater than 40, or greater than 50. In embodiments, the modified polyethylene composition may have a ratio of viscosities of from 20 to 50, from 20 to 40, from 20 to 30, from 30 to 50, from 30 to 40, from 40 to 50, or any combination of these ranges.

In one or more embodiments, the modified polyethylene composition may have a tan delta ratio of from 5 to 20, when measured using the DMS frequency swap test methods described herein. As used herein, "tan delta ratio" refers to a ratio of the tan delta at 0.1 rad/sec per tan delta at 500 rad/sec, when measured using the DMS frequency swap test methods described herein. In embodiments, the modified polyethylene composition may have a tan delta ratio of from 5 to 15, from 5 to 10, from 10 to 20, from 10 to 15, from 15 to 20, or any combination of these ranges. A lower value of tan delta typically reflects greater elasticity. Without being bound by theory, it is believed that the greater elasticity could be related to a combination of factors such as higher molecular weight (lower MI), or higher amount of LCB and broader MWD. In one or more embodiments, the modified polyethylene composition may maintain lower elasticity at lower shear rates (i.e. higher tan delta) but simultaneously exhibit high melt strength and lower viscosity at the higher shear rate. In embodiments, a modified polyethylene composition having a tan delta ratio of from 5 to 20 at 0.1/500 rad/sec freq. may indicate lower elasticity due to the lower long chain branching content, which may provide desired properties when the modified polyethylene composition is utilized in film.

In one or more embodiments, the modified polyethylene composition may have a viscosity of less than 600 Pa·s, when measured at a frequency of 500 rad/s according to the DMS frequency swap test methods described herein. Without being bound by theory, having a lower viscosity value at higher shear rates may evidence easier processability. In embodiments, the modified polyethylene composition may have a viscosity of from 400 Pa·s to 600 Pa·s, from 400 Pa·s to 580 Pa·s, from 400 Pa·s to 560 Pa·s, from 400 Pa·s to 540 Pa·s, from 400 Pa·s to 520 Pa·s, from 400 Pa·s to 500 Pa·s, from 400 Pa·s to 480 Pa·s, from 400 Pa·s to 460 Pa·s, from 400 Pa·s to 440 Pa·s, from 400 Pa·s to 420 Pa·s, from 420 Pa·s to 600 Pa·s, from 420 Pa·s to 580 Pa·s, from 420 Pa·s to 560 Pa·s, from 420 Pa·s to 540 Pa·s, from 420 Pa·s to 520 Pa·s, from 420 Pa·s to 500 Pa·s, from 420 Pa·s to 480 Pa·s, from 420 Pa·s to 460 Pa·s, from 420 Pa·s to 440 Pa·s, from 440 Pa·s to 600 Pa·s, from 440 Pa·s to 580 Pa·s, from 440 Pa·s to 560 Pa·s, from 440 Pa·s to 540 Pa·s, from 440 Pa·s to 520 Pa·s, from 440 Pa·s to 500 Pa·s, from 440 Pa·s to 480 Pa·s, from 440 Pa·s to 460 Pa·s, from 460 Pa·s to 600 Pa·s, from 460 Pa·s to 580 Pa·s, from 460 Pa·s to 560 Pa·s, from 460 Pa·s to 540 Pa·s, from 460 Pa·s to 520 Pa·s, from 460 Pa·s to 500 Pa·s, from 460 Pa·s to 480 Pa·s, from 480 Pa·s to 600 Pa·s, from 480 Pa·s to 580 Pa·s, from 480 Pa·s to 560 Pa·s, from 480 Pa·s to 540 Pa·s, from 480 Pa·s to 520 Pa·s, from 480 Pa·s to 500 Pa·s, from 500 Pa·s to 600 Pa·s, from 500 Pa·s to 580 Pa·s, from 500 Pa·s to 560 Pa·s, from 500 Pa·s to 540 Pa·s, from 500 Pa·s to 520 Pa·s, from 520 Pa·s to 600 Pa·s, from 520 Pa·s to 580 Pa·s, from 520 Pa·s to 560 Pa·s, from 520 Pa·s to 540 Pa·s, from 540 Pa·s to 600 Pa·s, from 540 Pa·s to 580 Pa·s, from 540 Pa·s to 560 Pa·s, from 560 Pa·s to 600 Pa·s, from 560 Pa·s to 580 Pa·s, from 580 Pa·s to 600 Pa·s, or any combination of these ranges, when measured at a frequency of 500 rad/s according to the DMS frequency swap test methods described herein.

In embodiments, the modified polyethylene composition may have a crossover frequency of less than 60 rad/sec. In embodiments, the modified polyethylene composition may have a crossover frequency of from 15 rad/s to 60 rad/sec, from 15 rad/s to 45 rad/sec, from 15 rad/s to 30 rad/sec, from 30 rad/s to 60 rad/sec, from 30 rad/s to 45 rad/sec, from 45 rad/s to 60 rad/sec, or any combination of these ranges. In embodiments, the crossover frequency of the modified polyethylene composition may correlate to bubble stability when running a blown film line at higher rates, since the increased level of branching may lead to higher melt strength.

Multimodal Polyethylene Composition and Characterization

Embodiments of the multimodal polyethylene composition will now be described, which may be utilized in the polyethylene formulation to produce the modified polyethylene composition. In embodiments, the multimodal polyethylene composition may impart lower viscosity properties at higher shear rates, which provide a modified polyethylene composition with improved processability.

In one or more embodiments, the multimodal polyethylene composition may have a density of 0.924 g/cm³ to 0.936 g/cm³. For example, embodiments of the presently disclosed polyethylene compositions may have densities of from 0.924 g/cm³ to 0.931 g/cm³, from 0.924 g/cm³ to 0.928 g/cm³, from 0.927 g/cm³ to 0.931 g/cm³, or from 0.929 g/cm³ to 0.933 g/cm³. According to additional embodiments, the multimodal polyethylene composition may have a density of from 0.924 to 0.928, from 0.928 g/cm³ to 0.932 g/cm³, from 0.932 g/cm³ to 0.936 g/cm³, or any combination of these ranges.

In one or more embodiments, the multimodal polyethylene composition may have a melt index ($I_2$) of 0.25 g/10 minutes to 2.0 g/10 minutes, such as 0.5 g/10 minutes to 1.2 g/10 minutes. For example, in one or more embodiments, the multimodal polyethylene composition may have a melt index ($I_2$) of from 0.25 g/10 minutes to 0.5 g/10 minutes, from 0.5 g/10 minutes to 0.7 g/10 minutes, from 0.7 g/10 minutes to 0.9 g/10 minutes, from 0.59 g/10 minutes to 1.1 g/10 minutes, from 1.1 g/10 minutes to 1.3 g/10 minutes, from 1.3 g/10 minutes to 1.5 g/10 minutes, from 1.5 g/10 minutes to 1.7 g/10 minutes, from 1.7 g/10 minutes to 2.0 g/10 minutes, or any combination of these ranges. According to additional embodiments, the multimodal polyethylene composition may have a melt index ($I_2$) of from 0.65 to 1.05.

According to one or more additional embodiments, the multimodal polyethylene composition may have a zero shear viscosity ratio of less than 2.0. For example, the multimodal polyethylene composition may have a zero shear viscosity ratio of less than 1.9, less than 1.8, less than 1.7, less than 1.6, less than 1.5, less than 1.4, less than 1.3, less than 1.2, less than 1.1, or even less than 1.0.

According to embodiments, the multimodal polyethylene compositions may have a molecular weight distribution (MWD), expressed as the ratio of the weight average molecular weight to number average molecular weight ($M_{w(GPC)}/M_{n(GPC)}$), in the range of from 2.5 to 8.0. For example, the multimodal polyethylene composition may have a molecular weight distribution of from 2.5 to 3.0, from 3.0 to 3.5, from 3.5 to 4.0, from 4.0 to 4.5, from 4.5 to 5.0, from 5.0 to 5.5, from 5.5 to 6.0, from 6.0 to 6.5, from 6.5 to 7.0, from 7.0 to 7.5, from 7.5 to 8.0, or any combination of these ranges. In additional embodiments, the multimodal polyethylene composition may have a molecular weight distribution of from 3.0 to 5.0. As presently described, the molecular weight distribution may be calculated according to gel permeation chromatography (GPC) techniques as described herein.

According to one or more additional embodiments, the multimodal polyethylene composition may have a zero shear viscosity ratio of less than 2.0. For example, the multimodal polyethylene composition may have a zero shear viscosity ratio of less than 1.9, less than 1.8, less than 1.7, less than 1.6, less than 1.5, less than 1.4, less than 1.3, less than 1.2, or even less than 1.1. In one or more embodiments, the multimodal polyethylene composition may have a zero shear viscosity ratio of at least 1.0. In embodiments, the multimodal polyethylene composition may have a zero shear viscosity ratio of from 1.0 to 2.0, from 1.0 to 1.8, from 1.0 to 1.6, from 1.0 to 1.4, from 1.0 to 1.2, from 1.2 to 2.0, from 1.2 to 1.8, from 1.2 to 1.6, from 1.2 to 1.4, from 1.4 to 2.0, from 1.4 to 1.8, from 1.4 to 1.6, from 1.6 to 2.0, from 1.6 to 1.8, or from 1.8 to 2.0.

Tan delta (tan δ) refers to a measure of how close a material is to a perfectly-elastic solid (where d=0°, tan delta=0) or of how close a material is to a perfectly-Newtonian liquid (where d=90°, tan delta≈infinity). Thus, lower values of tan d reflect greater elasticity. Tan delta is a function of long chain branching (LCB) and molecular weight distribution (MWD) at the same overall molecular weight. Higher tan delta values indicate lower LCB. In embodiments, the multimodal polyethylene composition may have a tan delta at 0.1 radian/sec and 190° C. of from 3 to 100. In embodiments, the multimodal polyethylene composition may have a tan delta at 0.1 radian/sec and 190° C. of from 10 to 100, 10 to 90, 10 to 80, 10 to 70, 10 to 60, 10 to 50, 10 to 40, 10 to 30, 10 to 20, 20 to 100, 20 to 90, 20 to 80, 20 to 70, 20 to 60, 20 to 50, 20 to 40, 20 to 30, 30 to 100, 30 to 90, 30 to 80, 30 to 70, 30 to 60, 30 to 50, 30 to 40, 40 to 100, 40 to 90, 40 to 80, 40 to 70, 40 to 60, 40 to 50, 50 to 100, 50 to 90, 50 to 80, 50 to 70, 50 to 60, 60 to 100, 60 to 90, 60 to 80, 60 to 70, 70 to 100, 70 to 90, 70 to 80, 80 to 100, 80 to 90, or 90 to 100.

As described herein, a polyethylene "fraction" refers to a portion of the total composition of the multimodal polyethylene composition. The presently disclosed embodiments include at least a "first polyethylene fraction" and a "second polyethylene fraction." The various fractions included in the multimodal polyethylene composition may be quantified by their temperature range in an elution profile via improved comonomers composition distribution (iCCD) analysis method. Unless specified, any elution profile referred to herein is the elution profile observed via iCCD. Examples of such fractions will be better understood in view of the examples provided herewith. In general, the first fraction may include a single peak in the temperature range of the first fraction and the second fraction may include a single peak in the temperature range of the second fraction. The multimodal polyethylene compositions described herein may be referred to as "multimodal," meaning that they include at least two peaks in their elution profile. Some embodiments may be "bimodal," meaning that two major peaks are present.

In reference to the described iCCD distribution, FIG. 1 schematically depicts a sample ICCD distribution 100 along with the cumulative weight fraction curve 200. FIG. 1 depicts, generally, several features of the iCCD profiles of the presently described polyethylene compositions, such as the first fraction, the second fraction, half peak widths, etc., which are discussed in detail herein. As such, FIG. 1 can be used as a reference with respect to the disclosures related the iCCD profile provided herein. Specifically, the first fraction 102 and second fraction 106 are depicted. The first fraction 102 has a peak 104 and the second fraction 106 has a peak 108. Each fraction has a half peak width 110 and 112.

In one or more embodiments, the first polyethylene fraction may have a single peak in a temperature range of 45° C. to 87° C. in an elution profile via iCCD. As used herein, a "single peak" refers to an iCCD wherein a particular fraction include only a single peak. That is, in some embodiments, the iCCD of the first and second polyethylene fraction includes only an upward sloping region followed by a downward sloping region to form the single peak. In one or more embodiments, the single peak of the first polyethylene fraction may be in a temperature range of from 60° C. to 85° C., such as from 70° C. to 85° C. Without being bound by theory, it is believed that in at least some embodiments of the presently disclosed polyethylene composition where a dual reactor design is used for polymerization, a combination of higher density crystalline domain and lower density amorphous domain may exist. The impact strength is controlled predominantly by the amorphous region or the tie concentrations that connect the adjacent lamellae. The relative tie chain concentration is estimated to be relatively large when the density is less than 0.910 g/cc. The peak of the first polymer fraction in the presently disclosed compositions may lie in the temperature range of 60° C. to 85° C., which may provide greater tie-chain concentration for functional benefits such as improved toughness.

It should be understood that a peak in the first or second polyethylene fraction may not be formed by a local minimum in the respective polyethylene fraction at a defined temperature boundary. That is, the peak must be a peak in the context of the entire spectrum, not a peak formed by the threshold temperature of a polyethylene fraction. For example, if a single peak followed by a single valley were present in a polyethylene fraction (an upward slope followed by a downward slope followed by an upward slope), only a single peak would be present in such a polyethylene fraction.

In one or more embodiments, the second polyethylene fraction may have a single peak in the temperature range of 95° C. to 120° C. in the elution profile via iCCD. The temperature range of the second polyethylene fraction of 95 to 120° C. may be desirable because the low molecular weight, high density component at 95° C. to 120° C. may allow the polyethylene to achieve higher overall density while maintaining a lower density fraction as described by the ratio of these two fractions.

In one or more embodiments, the width of the first peak of the second polyethylene fraction at 50 percent peak height may be less than 5.0° C., less than 4° C., or even less than 3° C. Generally, lesser temperature ranges at 50 percent peak heights correspond to a "sharper" peak. Without being bound by any particular theory, it is believed that a "sharper" or "narrower" peak is a characteristic caused by the molecular catalyst and indicates minimum comnomer incorporation on the higher density fraction, enabling higher density split between the two fractions.

In one or more embodiments, the multimodal polyethylene composition may have a local minimum in an elution profile via iCCD in a temperature range of from 80° C. to 90° C. This local minimum may fall between the peaks of the first polyethylene fraction and the second polyethylene fraction.

In embodiments described herein, the first polyethylene fraction area is the area in the elution profile between 45° C. and 87° C., beneath the single peak of the first polyethylene fraction. Similarly, the second polyethylene fraction area is the area in the elution profile between 95° C. and 120° C., beneath the single peak of the second polyethylene fraction. The first polyethylene fraction area and the second polyethylene fraction, respectively, may correspond generally with the total relative mass of each polymer fraction in the multimodal polyethylene composition. In general, a polyethylene fraction area in an iCCD profile may be determined by integrating the iCCD profile between the starting and ending temperatures specified.

According to one or more embodiments, the difference between the single peak of the second polyethylene fraction and the single peak of the first polyethylene fraction may be at least 10° C. For example, the difference between the single peak of the second polyethylene fraction and the single peak of the first polyethylene fraction may be at least 12° C., 13° C., 14° C., 15° C., 16° C., 17° C., 18° C., 19° C., or even at least 20° C.

In one or more embodiments, the first polyethylene fraction area may comprise at least 40% of the total area of the elution profile (for example, at least 42%, at least 44%, at least 46%, at least 48%, at least 50%, at least 52%, or even at least 54% of the total area of the elution profile). For example, the first polyethylene fraction area may comprise from 40% to 65% of the total area of the elution profile, such as from 42% to 58%, from 43% to 45%, from 45% to 47%, from 53% to 55%, or from 55% to 57%.

According to one or more embodiments, the second polyethylene fraction area may comprise at least 25% of the total area of the elution profile (for example, at least 30%, at least 35%, or even at least 40% of the total area of the elution profile). For example, the second polyethylene fraction area may comprise from 20% to 50%, from 27% to 31% or from 41% to 48% of the total area of the elution profile.

According to some embodiments, a ratio of the first polyethylene fraction area to the second polyethylene fraction area may be from 0.75 to 2.5 (such as 0.75 to 1.0, 1.0 to 1.25, from 1.25 to 1.5, from 1.5 to 1.75, from 1.75 to 2.0, from 2.0 to 2.25, from 2.25 to 2.5, or any combination of these ranges).

In one or more embodiments, the multimodal polyethylene composition is formed from the polymerization of ethylene and a comonomers such as a $C_3$-$C_2$ alkene. Contemplated comonomers include $C_6$-$C_9$ alkenes, such as 1-octene and 1-hexene. In one or more embodiments where the comonomers is 1-octene, the ratio of 1-octene monomeric units to ethylene monomeric units in one of the fractions is from 0.2 to 0.4, such as approximately 0.3, and the ratio of 1-octene monomeric units to ethylene monomeric units in the other fraction is from 0.05 to 0.2.

In one or more embodiments, the difference between the single peak of the second polyethylene fraction and the single peak of the first polyethylene fraction is at least 5° C., at least 10° C., at least 15° C., or even at least 20° C.

In one or more embodiments, the first polyethylene fraction may have a melt index ($I_2$) of 0.01 to 0.18 g/10 minutes. For example, according to one or more embodiments, the first polyethylene fraction may have a melt index ($I_2$) of from 0.1 g/10 minutes to 0.3 g/10 minutes, from 0.3 g/10 minutes to 0.5 g/10 minutes, from 0.5 g/10 minutes to 0.7 g/10 minutes, from 0.7 g/10 minutes to 0.9 g/10 minutes, from 0.9 g/10 minutes to 1.1 g/10 minutes, from 1.1 g/10 minutes to 1.3 g/10 minutes, from 1.3 g/10 minutes to 1.5 g/10 minutes, from 1.5 g/10 minutes to 1.8 g/10 minutes, or any combination of these ranges.

In one or more embodiments, the second polyethylene fraction may have a melt index ($I_2$) of 1 to 10,000 g/10 minutes. For example, according to one or more embodiments, the second polyethylene fraction may have a melt index ($I_2$) of from 10 g/10 minutes to 1,000 g/10 minutes, from 20 g/10 minutes to 800 g/10 minutes, from 1 g/10 minutes to 100 g/10 minutes, from 100 g/10 minutes to 1,000 g/10 minutes, from 1,000 g/10 minutes to 10,000 g/10 minutes, or any combination of these ranges.

In one or more embodiments, the weight average molecular weight of the second polyethylene fraction may be less than or equal to 120,000 g/mol, such as from 20,000 g/mol to 120,000 g/mol, or from 40,000 g/mol to 65,000 g/mol. In additional embodiments, the weight average molecular weight of the second polyethylene fraction may be from 20,000 g/mol to 40,000 g/mol, from 40,000 g/mol to 60,000 g/mol, from 60,000 g/mol to 80,000 g/mol, from 80,000 g/mol to 100,000 g/mol, from 100,000 g/mol to 120,000 g/mol, or any combination of these ranges. Molecular weight of the polyethylene fractions may be calculated based on GPC results, as described hereinbelow.

In one or more embodiments, the multimodal polyethylene composition may have a weight average molecular weight of less than or equal to 80,000 g/mol in the temperature range of 95° C. to 120° C. on an elution profile via iCCD. In one or more embodiments, the multimodal polyethylene composition may have a weight average molecular weight of from 5,000 g/mol to 80,000 g/mol, from 5,000 g/mol to 60,000 g/mol, from 5,000 g/mol to 40,000 g/mol, from 5,000 g/mol to 20,000 g/mol, from 20,000 g/mol to 80,000 g/mol, from 20,000 g/mol to 60,000 g/mol, from 20,000 g/mol to 40,000 g/mol, from 40,000 g/mol to 80,000 g/mol, from 50,000 g/mol to 60,000 g/mol, from 60,000 g/mol to 80,000 g/mol, or any combination of these ranges, in the temperature range of 95° C. to 120° C. on an elution profile via iCCD.

The multimodal polyethylene compositions described herein may have relatively good dart strength when formed into monolayer blown films. According to one or more embodiments, a monolayer blown film formed from the multimodal polyethylene composition and having a thickness of two mils has a Dart drop impact of at least 1000 grams when measured according to ASTM D1709 Method A. In additional embodiments, a monolayer blown film formed from the multimodal polyethylene composition and having a thickness of two mils has a Dart drop impact of at least 1100 grams, at least 1200 grams, at least 1300 grams, at least 1400 grams, at least 1500 grams, at least 1600 grams, at least 1700 grams, at least 1800 grams, at least 1900 grams, or even at least 2000 grams when measured according to ASTM D1709 Method A.

According to additional embodiments, the multimodal polyethylene compositions may have Dow Rheology Index of less than or equal to 5, such as less than or equal to 4, less than or equal to 3, less than or equal to 2, or even less than or equal to 1.

In one or more embodiments, the multimodal polyethylene compositions may further comprise additional components such as one or more additives. Such additives include, but are not limited to, antistatic agents, color enhancers, dyes, lubricants, fillers such as $TiO_2$ or $CaCO_3$, opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, and combinations thereof. The multimodal polyethylene compositions may contain from about 0.1 to about 10 percent by the combined weight of such additives, based on the weight of the multimodal polyethylene composition including such additives.

Polymerization of the Multimodal Polyethylene Composition

Any conventional polymerization processes may be employed to produce the multimodal polyethylene compositions described herein. Such conventional polymerization processes include, but are not limited to, slurry polymerization processes, solution polymerization process, using one or more conventional reactors, e.g., loop reactors, isothermal reactors, stirred tank reactors, batch reactors in parallel, series, and/or any combinations thereof. The multimodal polyethylene composition may, for example, be produced via solution phase polymerization process using one or more loop reactors, isothermal reactors, and combinations thereof.

In general, the solution phase polymerization process may occur in one or more well-mixed reactors such as one or more isothermal loop reactors or one or more adiabatic reactors at a temperature in the range of from 115 to 250° C. (e.g., from 115 to 210° C.), and at pressures in the range of from 300 to 1,000 psi (e.g., from 400 to 800 psi). In some embodiments, in a dual reactor, the temperature in the first reactor is in the range of from 115 to 190° C. (e.g., from 160 to 180° C.), and the second reactor temperature is in the range of 150 to 250° C. (e.g., from 180 to 220° C.). In other embodiments, in a single reactor, the temperature in the reactor is in the range of from 115 to 250° C. (e.g., from 115 to 225° C.).

The residence time in solution phase polymerization process may be in the range of from 2 to 30 minutes (e.g., from 5 to 25 minutes). Ethylene, solvent, hydrogen, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Tex. The resultant mixture of the multimodal polyethylene composition and solvent is then removed from the reactor and the multimodal polyethylene composition is isolated. Solvent is typically recovered via a solvent recovery unit, e.g., heat exchangers and vapor liquid separator drum, and is then recycled back into the polymerization system.

In some embodiments, the multimodal polyethylene composition may be produced via solution polymerization in a dual reactor system, for example a dual loop reactor system, wherein ethylene is polymerized in the presence of one or more catalyst systems. In some embodiments, only ethylene is polymerized. Additionally, one or more cocatalysts may be present. In another embodiment, the multimodal polyethylene composition may be produced via solution polymerization in a single reactor system, for example a single loop reactor system, wherein ethylene is polymerized in the presence of two catalyst systems. In some embodiments, only ethylene is polymerized.

Catalyst Systems of the Multimodal Polyethylene Composition

Specific embodiments of catalyst systems that can, in one or more embodiments, be used to produce the multimodal polyethylene compositions described herein will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{40})$alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{40})$alkyl substituted with exactly one group $R^S$, where $R^S$ is phenyl (—$C_6H_5$)" may contain from 7 to 46 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or function group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable, and unless clearly specified mean the same thing.

The term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

In this disclosure, a $(C_1-C_{40})$hydrocarbyl can be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In some embodiments, each of the aforementioned $(C_1-C_{40})$hydrocarbyl groups has a maximum of 20 carbon atoms (i.e., $(C_1-C_{20})$hydrocarbyl) and other embodiments, a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more RS. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" (with square brackets) means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_1-C_{20})$aryl; substituted $(C_6-C_{18})$aryl; 2,4-bis [$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene include unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on the same carbon atom (e.g., —CH$_2$—) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of $(C_2-C_{20})$alkylene α,ω-diradicals include ethan-1,2-diyl (i.e. —CH$_2$CH$_2$—), propan-1,3-diyl (i.e. —CH$_2$CH$_2$CH$_2$—), 2-methylpropan-1,3-diyl (i.e. —CH$_2$CH(CH$_3$)CH$_2$—). Some examples of $(C_6-C_{50})$arylene α,ω-diradicals include phenyl-1,4-diyl, napthalen-2,6-diyl, or napthalen-3,7-diyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{50})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$)—, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted normal-1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis (methylene)bicyclo [2.2.2] octane.

The term "$(C_3-C_{40})$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of heteroatoms include O, S, S(O), S(O)$_2$, Si($R^C$)$_2$, P($R^P$), N($R^N$), —N=C($R^C$)$_2$, —Ge($R^C$)$_2$—, or —Si($R^C$)—, where each $R^C$, each $R^N$, and each $R^P$ is unsubstituted $(C_1-C_{18})$hydrocarbyl or —H. The term "heterohydrocarbon" refers to a molecule or molecular framework in which one or more carbon atoms are replaced with a heteroatom. The term "$(C_1-C_{40})$heterohydrocarbyl" means a heterohydrocarbon radical of from 1 to 40 carbon atoms and the term "$(C_1-C_{40})$heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The $(C_1-C_{40})$heterohydrocarbyl may be unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si($R^C$)$_2$—, $(C_1-C_{40})$hydrocarbyl-N($R^N$)—, $(C_1-C_{40})$hydrocarbyl-P($R^P$)—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{40})$heteroaryl" means an unsubstituted or substituted (by one or more $R^S$) mono-, bi- or tricyclic heteroaromatic hydrocarbon radical of from 4 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be 0, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f] indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing $(C_1-C_{50})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include Si($R^C$)$_3$, Ge($R^C$)$_3$, Si($R^C$)$_2$, Ge($R^C$)$_2$, P($R^P$)$_2$, P($R^P$), N($R^N$)$_2$, N($R^N$), N, O, O$R^C$, S, S$R^C$, S(O), and S(O)$_2$, wherein each of the heteroalkyl and heteroalkylene groups are unsubstituted or substituted by one or more $R^S$.

Examples of substituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide- 2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^−$), chloride ($Cl^−$), bromide ($Br^−$), or iodide ($I^−$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

According to some embodiments, a catalyst system for producing a polyethylene composition includes a metal-ligand complex according to formula (I):

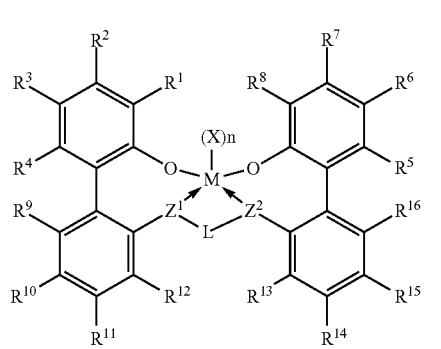

(I)

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N($R^N$)—, or —P($R^P$)—; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groups in Formula (I) (to which L is bonded) or the ($C_1$-$C_{40}$)heterohydrocarbylene has a portion that comprises a 1-atom to 10-atom linker backbone linking the two Z groups in Formula (I), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is ($C_1$-$C_{30}$)hydrocarbyl or ($C_1$-$C_{30}$)heterohydrocarbyl; $R^1$ and $R^8$ are independently selected from the group consisting of —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —OR$^C$, —SR$^C$, —NO$_2$, —CN, —CF$_3$, $R^C$S(O)—, $R^C$S(O)$_2$—, ($R^C$)$_2$C═N—, $R^C$C(O)O—, $R^C$OC(O)—, $R^C$C(O)N($R^N$)—, ($R^N$)$_2$NC(O)—, halogen, and radicals having formula (II), formula (III), or formula (IV):

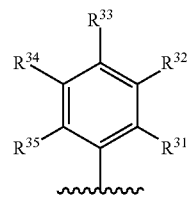

(II)

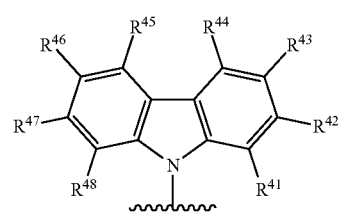

(III)

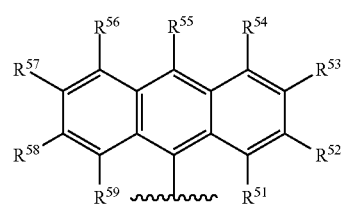

(IV)

In formulas (II), (III), and (IV), each of $R^{31-35}$, $R^{41-48}$, or $R^{51-59}$ is independently chosen from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N═CHR$^C$, —OR$^C$, —SR$^C$, —NO$_2$, —CN, —CF$_3$, $R^C$S(O)—, $R^C$S(O)$_2$—, ($R^C$)$_2$C═N—, $R^C$C(O)O—, $R^C$OC(O)—, $R^C$C(O)N($R^N$)—, ($R^N$)$_2$NC(O)—, halogen, or —H, provided at least one of $R^1$ or $R^8$ is a radical having formula (II), formula (III), or formula (IV).

In formula (I), each of $R^{2-4}$, $R^{5-7}$, and $R^{9-16}$ is independently selected from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N═CHR$^C$, —OR$^C$, —SR$^C$, —NO$_2$, —CN, —CF$_3$, $R^C$S(O)—, $R^C$S(O)$_2$—, ($R^C$)$_2$C═N—, $R^C$C(O)O—, $R^C$OC(O)—, $R^C$C(O)N($R^N$)—, ($R^C$)$_2$NC(O)—, halogen, and —H.

In some embodiments, the multimodal polyethylene composition is formed using a first catalyst according to formula (I) in a first reactor and a different catalyst according to formula (I) in a second reactor.

In one exemplary embodiment where a dual loop reactor is used, the procatalyst used in the first loop is zirconium, [[2,2'''-[[bis[1-methylethyl)germylene]bis(methyleneoxy-κO)]bis[3'',5,5''-tris(1,1-dimethylethyl)-5'-octyl[1,1':3',1''-terphenyl]-2'-olato-κO]](2-)]dimethyl-, having the chemical formula $C_{86}H_{128}F_2GeO_4Zr$ and the following structure:

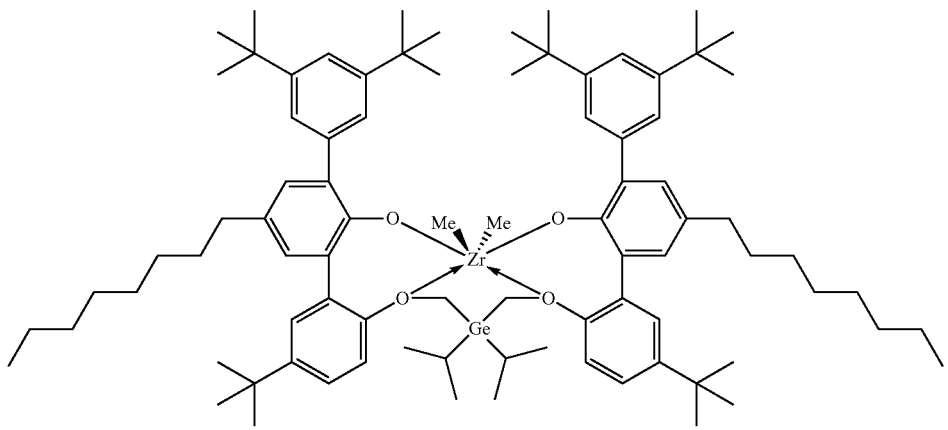

In such an embodiment, the procatalyst used in the second loop is zirconium, [[2,2'''-[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1']-biphenyl]-2-olato-κO]](2-)]dimethyl, having the chemical formula $C_{107}H_{154}N_2O_4Si_2Zr$ and the following structure:

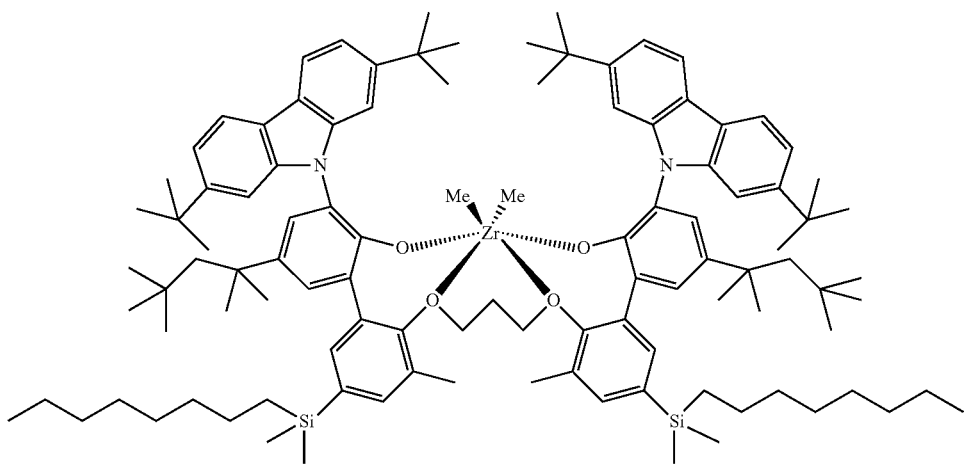

Co-Catalyst Component of the Multimodal Polyethylene Composition

The catalyst system comprising a metal-ligand complex of formula (I) may be rendered catalytically active by any technique known in the art for activating metal-based catalysts of olefin polymerization reactions. For example, the system comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 $(C_1-C_{20})$hydrocarbyl substituents as described herein. In one embodiment, Group 13 metal compounds are tri$((C_1-C_{20})$hydrocarbyl)-substituted-aluminum or tri$((C_1-C_{20})$hydrocarbyl)-boron compounds. In other embodiments, Group 13 metal compounds are tri(hydrocarbyl)-substituted-aluminum, tri$((C_1-C_{20})$hydrocarbyl)-boron compounds, tri$((C_1-C_{10})$alkyealuminum, tri$((C_6-C_{18})$aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris $((C_1-C_{20})$hydrocarbyl borate (e.g. trityl tetrafluoroborate) or a tri$((C_1-C_{20})$hydrocarbyl)ammonium tetra$((C_1-C_{20})$hydrocarbyeborane (e.g. bis(octadecyl)methylammonium tetrakis (pentafluorophenyl)borane). As used herein, the term "ammonium" means a nitrogen cation that is a $((C_1-C_{20})$ hydrocarbyl)$_4N^+$ a $((C_1-C_{20})$hydrocarbyl)$_3N(H)^+$, a $((C_1-C_{20})$hydrocarbyl)$_2N(H)_2^+$, $(C_1-C_{20})$hydrocarbylN(H)$_3^+$, or $N(H)_4^+$, wherein each $(C_1-C_{20})$hydrocarbyl, when two or more are present, may be the same or different.

Combinations of neutral Lewis acid activators (co-catalysts) include mixtures comprising a combination of a tri((C$_1$-C$_4$)alkyl)aluminum and a halogenated tri((C$_6$-C$_{18}$)aryl)boron compound, especially a tris(pentafluorophenyl)borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane):(alumoxane) [e.g., (Group 4 metal-ligand complex:(tris(pentafluoro-phenylborane):(alumoxane)] are from 1:1:1 to 1:10:30, in other embodiments, from 1:1:1.5 to 1:5:10

The catalyst system comprising the metal-ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate(1$^-$) amine, and combinations thereof.

In some embodiments, one or more of the foregoing activating co-catalysts are used in combination with each other. An especially preferred combination is a mixture of a tri((C$_1$-C$_4$)hydrocarbyl)aluminum, tri((C$_1$-C$_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Free Radical Generator (FRG)

As noted above, embodiments of the modified polyethylene compositions may be the reaction product of a polyethylene formulation that includes a free radical generator. In embodiments herein, the free radical generator may have a half-life at 220° C. of less than 200 seconds and a decomposition energy higher than (i.e., more negative than) −250 kJ/mol. In some embodiments, the free radical generator has a half-life at 220° C. of less than 175 seconds, 150 seconds, or 125 seconds. In other embodiments, the free radical generator may have a half-life at 220° C. of from 60 to 200 seconds, 60 to 175 seconds, 60 to 150 second, 60 to 125 seconds, or 60 to 120 seconds.

In embodiments herein, the free radical generator may have a molecular weight from 200 to 1,000 Daltons. All individual values and subranges of from 200 to 1,000 Daltons are included and disclosed herein. For example, in some embodiments, the free radical generator may have a molecular weight from 225 Daltons to 1000 Daltons, 250 Daltons to 1000 Daltons, or 250 Daltons to 700 Daltons.

In embodiments herein, the free radical generator is present in an amount ranging from 5 ppm to 1000 ppm relative to the total amount of resin. All individual values and subranges from 5 to 1,000 ppm are included herein and disclosed herein; for example, the amount of free radical generator relative to the total amount of resin may range from a lower limit of 5, 10, 20, 30, 50, 80, 100, 200, 300, 400, 500, 600, 700, 800 or 900 ppm to an upper limit of 15, 25, 30, 35, 50, 60, 65, 75, 100, 150, 250, 350, 450, 550, 650, 750, 850, 950 or 1000 ppm. In some embodiments, the amount of free radical generator reacted with the multimodal polyethylene composition may be in the range of from 5 to 100 ppm relative to the total amount of resin, or in the alternative, the amount of free radical generator reacted with the multimodal polyethylene composition may be in the range of from 5 to 80 ppm relative to the total amount of resin, or in the alternative, the amount of free radical generator reacted with the multimodal polyethylene composition may be in the range of from 5 to 75 ppm relative to the total amount of resin, or in the alternative, the amount of free radical generator reacted with the multimodal polyethylene composition may be in the range of from 10 to 75 ppm relative to the total amount of resin, or in the alternative, the amount of free radical generator reacted with the multimodal polyethylene composition may be in the range of from 5 to 50 ppm relative to the total amount of resin. In other embodiments, the amount of free radical generator reacted with the multimodal polyethylene composition is less than 30 ppm relative to the total amount of resin used. In further embodiments, the amount of free radical generator reacted with the multimodal polyethylene composition may range from 5 ppm to 30 ppm, 10 ppm to 30 ppm, 15 to 25 ppm, 20 to 30 ppm, or 10 to 25 ppm.

In embodiments herein, the free radical generator may be a cyclic peroxide. An example of a suitable cyclic peroxide may be represented by the formula:

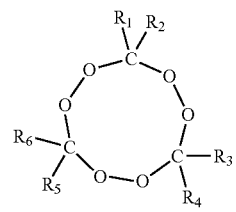

wherein R$_1$-R$_6$ are independently hydrogen or an inertly-substituted or unsubstituted C$_1$-C$_{20}$ alkyl, C$_3$-C$_{20}$ cycloalkyl, C$_6$-C$_{20}$ aryl, C$_7$-C$_{20}$ aralkyl, or C$_7$-C$_{20}$ alkaryl. Representative of the inert-substituents included in R$_1$-R$_6$ are hydroxyl, C$_1$-C$_{20}$ alkoxy, linear or branched C$_1$-C$_{20}$ alkyl, C$_6$-C$_{20}$ aryloxy, halogen, ester, carboxyl, nitrile, and amido. In some embodiments, R$_1$-R$_6$ are each independently lower alkyls, including, for example, C$_1$-C$_{10}$ alkyl, or C$_1$-C$_4$ alkyl.

Some of the cyclic peroxides as described herein are commercially available, but otherwise can be made by contacting a ketone with hydrogen peroxide as described in U.S. Pat. No. 3,003,000; Uhlmann, 3rd Ed., Vol. 13, pp. 256-57 (1962); the article, "Studies in Organic Peroxides XXV Preparation, Separation and Identification of Peroxides Derived from Methyl Ethyl Ketone and Hydrogen Peroxide," Milas, N. A. and Golubovic, A., J. Am. Chem. Soc, Vol. 81, pp. 5824-26 (1959); "Organic Peroxides", Swern, D. editor, Wiley Interscience, New York (1970); and Houben-Weyl Methoden der Organische Chemie, El 3, Volume 1, page 736.

Examples of the other cyclic peroxides include those derived from acetone, methylamyl ketone, methylheptyl ketone, methylhexyl ketone, methylpropyl ketone, methylbutyl ketone, diethyl ketone, methylethyl ketone methyloctyl ketone, methylnonyl ketone, methyldecyl ketone and methylundecyl ketone. The cyclic peroxides can be used alone or in combination with one another.

In some embodiments, the cyclic peroxide may be 3,6,9-triethyl-3-6-9-trimethyl-1,4,7-triperoxonane, which is commercially available from AkzoNobel under the trade designation TRIGONOX 301. The cyclic peroxide used herein can be liquid, solid, or paste depending on the melting point of the peroxide and the diluent, if any, within which it is carried.

In embodiments, the free radical generation may be present in a masterbatch composition that comprises a free radical generator and a carrier resin. In embodiments, the carrier resin polyethylene may be a polyethylene composition.

In some embodiments herein, the masterbatch composition may comprise less than 1,000 ppm of primary antioxidant. All individual values and subranges of less than 1,000 ppm of primary antioxidant are included and disclosed herein. For example, in some embodiments, the masterbatch composition may comprise from a lower limit of 0, 10, 25, 50, 100, 200, 300, 400, 500, 600, 700, 800, or 900 ppm to an upper limit of 15, 30, 50, 75, 100, 150, 250, 350, 450, 550, 650, 750, 850, 950, or 1,000 ppm of primary antioxidant. In other embodiments herein, the masterbatch composition may comprise from 10 to 1,000 ppm, from 10 to 500 ppm, from 500 to 1,000 ppm, from 10 to 300 ppm, or from 20 to 100 ppm of primary antioxidant.

The carrier resin may be a low density polyethylene (LDPE), a linear low density polyethylene (LLDPE), a medium density polyethylene (MDPE), a high density polyethylene (HDPE), or combinations thereof. In some embodiments, the carrier resin is a LDPE. In other embodiments, the second polyethylene is a LLDPE. In further embodiments, the second polyethylene is a MDPE or a HDPE.

The carrier resin may have a density ranging from 0.900 $g/cm^3$ to 0.970 $g/cm^3$ and a melt index ranging from 0.01 g/10 min to 100 g/10 min. All individual values and subranges of a density ranging from 0.900 $g/cm^3$ to 0.970 $g/cm^3$ and a melt index ranging from 0.01 g/10 min to 100 g/10 min are included and disclosed herein. In embodiments, the carrier resin may have a density of from 0.900 $g/cm^3$ to 0.970 $g/cm^3$, from 0.900 $g/cm^3$ to 0.960 $g/cm^3$, from 0.900 $g/cm^3$ to 0.940 $g/cm^3$, from 0.900 $g/cm^3$ to 0.920 $g/cm^3$, from 0.920 $g/cm^3$ to 0.970 $g/cm^3$, from 0.920 $g/cm^3$ to 0.960 $g/cm^3$, from 0.920 $g/cm^3$ to 0.940 $g/cm^3$, from 0.940 $g/cm^3$ to 0.970 $g/cm^3$, from 0.940 $g/cm^3$ to 0.960 $g/cm^3$, from 0.960 $g/cm^3$ to 0.970 $g/cm^3$, or any combinations of these ranges. In embodiments, the carrier resin may have a melt index of from 0.05 g/10 min to 30 g/10 min, from 0.1 g/10 min to 30 g/10 min, from 0.1 g/10 min to 25 g/10 min, from 0.1 g/10 min to 20 g/10 min, from 0.1 g/10 min to 18 g/10 min, from 0.1 g/15 min to 30 g/10 min, from 0.25 g/10 min to 15 g/10 min, from 0.25 g/10 min to 12 g/10 min, from 0.25 g/10 min to 10 g/10 min, from 0.25 g/10 min to 8 g/10 min, from 0.25 g/10 min to 5 g/10 min.

In some embodiments herein, the carrier resin may comprise less than 250 ppm of primary antioxidant. All individual values and subranges of less than 250 ppm of primary antioxidant are included and disclosed herein. For example, in some embodiments, the carrier resin may comprise less than 150 ppm, less than 100 ppm, less than 50 ppm, less than 25 ppm, or 0 ppm of primary antioxidant. In other embodiments herein, the multimodal polyethylene composition may comprise less than 250 ppm, less than 150 ppm, less than 100 ppm, less than 50 ppm, less than 25 ppm, or 0 ppm of primary antioxidant and the carrier resin may comprise less than 250 ppm, less than 150 ppm, less than 100 ppm, less than 50 ppm, less than 25 ppm, or 0 ppm of primary antioxidant. Of course, other individual values and subranges of less than 250 ppm of primary antioxidant present in the first and/or carrier resin are included and disclosed herein.

In embodiments herein where the carrier resin is an LDPE, the LDPE may include branched polymers that are partly or entirely homopolymerized or copolymerized in autoclave and/or tubular reactors, or any combination thereof, using any type of reactor or reactor configuration known in the art, at pressures above 14,500 psi (100 MPa) with the use of free-radical initiators, such as peroxides (see for example U.S. Pat. No. 4,599,392, herein incorporated by reference). In embodiments, the LDPE may be made in an autoclave process under single phase conditions designed to impart high levels of long chain branching, such as described in PCT patent publication WO 2005/023912, the disclosure of which is incorporated herein. Examples of suitable LDPEs may include, but are not limited to, ethylene homopolymers, and high pressure copolymers, including ethylene interpolymerized with, for example, vinyl acetate, ethyl acrylate, butyl acrylate, acrylic acid, methacrylic acid, carbon monoxide, or combinations thereof. The ethylene may also be interpolymerized with an alpha-olefin comonomer, for example, at least one C3-C20 alpha-olefin, such as propylene, isobutylene, 1-butene, 1-pentene, 1-hexene, and mixtures thereof. Exemplary LDPE resins may include, but is not limited to, resins sold by The Dow Chemical Company, such as, LDPE 4016 resins, LDPE 1321 resins, LDPE 6211 resins, LDPE 6621 resins, or AGILITY™ 1000 and 2001 resins, resins sold by Westlake Chemical Corporation (Houston, Tex.), such as EF412, EF602, EF403, or EF601, resins sold by LyondellBasell Industries (Houston, Tex.), such as, PETROTHENE™ M2520 or NA940, and resins sold by The ExxonMobil Chemical Company (Houston, Tex.) such as, LDPE LD 051.LQ or NEXXSTAR™ LDPE-00328. Other exemplary LDPE resins are described in WO 2014/051682 and WO 2011/019563, which are herein incorporated by reference.

In embodiments herein where the carrier resin is a LLDPE, the LLDPE may be a homogeneously branched or heterogeneously branched and/or unimodal or multimodal (e.g., bimodal) polyethylene. The linear low density polyethylene comprises ethylene homopolymers, interpolymers of ethylene and at least one comonomer, and blends thereof. Examples of suitable comonomers may include alpha-olefins. Suitable alphaolefins may include those containing from 3 to 20 carbon atoms (C3-C20). For example, the alpha-olefin may be a C4-C20 alpha-olefin, a C4-C12 alpha-olefin, a C3-C10 alphaolefin, a C3-C8 alpha-olefin, a C4-C8 alpha-olefin, or a C6-C8 alpha-olefin. In some embodiments, the linear low density polyethylene is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the linear low density polyethylene is an ethylene/alpha-olefin copolymer, wherein the alpha-olefin is selected from the group consisting of propylene, 1-butene, 1-hexene, and 1-octene. In further embodiments, the linear low density polyethylene is an ethylene/alpha-olefin copolymer, wherein the alpha-olefin is selected from the group consisting of 1-hexene and 1-octene.

The linear low density polyethylene can be made via gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. Suitable linear low density polyethylene may be produced according to the processes described at pages 15-17 and 20-22 in WO 2005/111291 A1, which is herein incorporated by reference. The catalysts used to make the linear low density polyethylene described herein may include Ziegler-Natta, chrome, metallocene, constrained geometry, or single site catalysts. Examples of suitable linear low density polyethylene include substantially linear ethylene polymers, which are further defined in U.S. Pat. Nos. 5,272,236, 5,278,272, 5,582,923, 5,733,155, and EP2653392, and which are incorporated by reference; homogeneously branched linear ethylene polymer compositions, such as those in U.S. Pat. No. 3,645,992, which is incorporated by reference; heterogeneously branched ethylene polymers, such as those prepared according to the process disclosed in U.S. Pat. No. 4,076,698; and/or blends thereof (such as those disclosed in U.S. Pat. No. 3,914,342 or 5,854,045), all of which is incorporated by reference. In some embodiments, the linear low density polyethylene may include ELITE™, ELITE™ AT, ATTANE™, AFFINITY™, FLEXOMER™, or DOWLEX™ resins sold by The Dow Chemical Company, including, for example, ELITE™ 5100G or 5400G resins, ELITE™ AT 6401, ATTANE™ 4201 or 4202 resins, AFFINITY™ 1840, and DOWLEX™ 2020, 2045G, 2049G, or 2685 resins; EXCEED™ or ENABLE™ resins sold by Exxon Mobil Corporation, including, for example, EXCEED™ 1012, 1018 or 1023JA resins, and ENABLE™ 27-03, 27-05, or 35-05 resins; linear low density polyethylene resins sold by Westlake Chemical Corporation, including, for example, LLDPE LF1020 or HIFOR Xtreme™ SC74836 resins; linear low density polyethylene resins sold by LyondellBasell Industries, including, for example, PETROTHENE™ GA501 and LP540200 resins, and ALATHON™ L5005 resin; linear low density polyethylene resins sold by Nova Chemicals Corp., including, for example, SCLAIR™ FP120 and NOVAPOL™ TF-Y534; linear low density polyethylene resins sold by Chevron Phillips Chemical Company, LLC, including, for example, mPACT™ D139 or D350 resins and MARFLEX™ HHM TR-130 resin; linear low density polyethylene resins sold by Borealis AG, including, for example, BORSTAR™ FB 2310 resin.

In embodiments herein where the carrier resin is a MDPE, the MDPE may be an ethylene homopolymer or copolymers of ethylene and alpha-olefins. Suitable alpha-olefins may include those containing from 3 to 20 carbon atoms ($C_3$-$C_{20}$). For example, the alpha-olefin may be a $C_4$-$C_{20}$ alpha-olefin, a $C_4$-$C_{12}$ alpha-olefin, a $C_3$-$C_{10}$ alpha-olefin, a $C_3$-$C_8$ alpha-olefin, a $C_4$-$C_8$ alpha-olefin, or a $C_6$-$C_8$ alpha-olefin. In some embodiments, the MDPE is an ethylene/alpha-olefin copolymer, wherein the alphaolefin is selected from the group consisting of propylene, 1-butene, 1-pentene, 1-hexene, 4-methyl-1-pentene, 1-heptene, 1-octene, 1-nonene and 1-decene. In other embodiments, the MDPE is an ethylene/alpha-olefin copolymer, wherein the alpha-olefin is selected from the group consisting of propylene, 1-butene, 1-hexene, and 1-octene. The MDPE may have a density of from 0.923 g/cm$^3$ and 0.935 g/cm$^3$. All individual values and subranges are included and disclosed herein.

The MDPE may be made by a gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. In some embodiments, the MDPE is made in the solution process operating in either parallel or series dual reactor mode. The MDPE may also be made by a high pressure, free-radical polymerization process. Methods for preparing MDPE by high pressure, free radical polymerization can be found in U.S. 2004/0054097, which is herein incorporated by reference, and can be carried out in an autoclave or tubular reactor as well as any combination thereof. The catalysts used to make the MDPE described herein may include Ziegler-Natta, metallocene, constrained geometry, single site catalysts, or chromium-based catalysts. Exemplary suitable MDPE resins may include resins sold by The Dow Chemical Company, such as, DOWLEX™ 2038.68G or DOWLEX™ 2042G, resins sold by LyondellBasell Industries (Houston, Tex.), such as, PETROTHENE™ L3035, ENABLE™ resins sold by The ExxonMobil Chemical Company (Houston, Tex.), resins sold by Chevron Phillips Chemical Company LP, such as, MARFLEX™ TR-130, and resins sold by Total Petrochemicals & Refining USA Inc., such as HF 513, HT 514, and HR 515. Other exemplary MDPE resins are described in U.S. 2014/0255674, which is herein incorporated by reference.

In embodiments herein where the carrier resin is a HDPE, the HDPE may also be an ethylene homopolymer or copolymers of ethylene and alpha-olefins. Suitable alpha-olefins may include those containing from 3 to 20 carbon atoms ($C_3$-$C_{20}$). For example, the alpha-olefin may be a $C_4$-$C_{20}$ alpha-olefin, a $C_4$-$C_{12}$ alpha-olefin, a $C_3$-$C_{10}$ alpha-olefin, a $C_3$-$C_8$ alpha-olefin, a $C_4$-$C_8$ alpha-olefin, or a $C_6$-$C_8$ alpha-olefin. In some embodiments, the HDPE is an ethylene/alpha-olefin copolymer, wherein the alphaolefin is selected from the group consisting of propylene, 1-butene, 1-pentene, 1-hexene, 4-methyl-1-pentene, 1-heptene, 1-octene, 1-nonene and 1-decene. In other embodiments, the HDPE is an ethylene/alpha-olefin copolymer, wherein the alpha-olefin is selected from the group consisting of propylene, 1-butene, 1-hexene, and 1-octene. The amount of comonomer used will depend upon the desired density of the HDPE polymer and the specific comonomers selected, taking into account processing conditions, such as temperature and pressure, and other factors such as the presence or absence of telomers and the like, as would be apparent to one of ordinary skill in the art in possession of the present disclosure. The HDPE may have a density of from 0.935 g/cm3 and 0.975 g/cm3. All individual values and subranges are included and disclosed herein.

The HDPE may be made by a gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. In some embodiments, the HDPE is made in the solution process operating in either parallel or series dual reactor mode. The catalysts used to make the HDPE described herein may include Ziegler-Natta, metallocene, constrained geometry, single site catalysts, or chromium-based catalysts. The HDPE can be unimodal, bimodal, and multimodal. Exemplary HDPE resins that are commercially available include, for instance, ELITE™ 5940G, ELITE™ 5960G, HDPE 35454L, HDPE 82054, HDPE DGDA-2484 NT, DGDA-2485 NT, DGDA-5004 NT, DGDB-2480 NT resins available from The Dow Chemical Company (Midland, Mich.), L5885 and M6020 HDPE resins from Equistar Chemicals, LP, ALATHON™ L5005 from LyondellBasell Industries (Houston, Tex.), and MARFLEX™ HDPE HHM TR-130 from Chevron Phillips Chemical Company LP. Other exemplary HDPE resins are described in U.S. Pat. No. 7,812,094, which is herein incorporated by reference.

Methods of Producing the Modified Polyethylene Compositions

As noted above, disclosed herein are methods for producing the modified polyethylene composition. In embodiments, the disclosed methods may provide a reaction product of the multimodal polyethylene composition and the free radical generator, which provides a modified polyethylene composition with a balance of lower viscosity at higher shear rates for easier processability and a higher melt strength at the lower shear rates to enhance film bubble stability during film fabrication. Without being bound by theory, it is believed that the introduction of the free radical generators described herein produces long chain branches or similar structure into the polymer, thereby increasing melt strength and/or low shear viscosity. The method comprises: providing the multimodal polyethylene composition; providing a free radical generator, for example, in a masterbatch composition; and reacting the multimodal polyethylene composition with the masterbatch composition to form the modified polyethylene composition.

The reacting of the multimodal polyethylene composition with the masterbatch composition can be carried out in any customary mixing equipment in which the polymer is melted and mixed with the masterbatch. Suitable equipment is known to those skilled in the art, including for example, mixers, kneaders, and extruders. In some embodiments, the reacting of the multimodal polyethylene composition with the free radical generator takes place in an extruder. The extruder may further be attached to a blown-film or cast film line. In some embodiments, the reacting of the multimodal polyethylene composition with the free radical generator takes place in an extruder attached to a blown-film or cast film line.

Exemplary extruder or kneader equipment includes, for example, single-screw extruders, contra-rotating and co-rotating twin-screw extruders, planetary-gear extruders, ring extruders, or co-kneaders. Suitable extruders and kneaders are further described, for example, in Handbuch der Kunststoftextrusion, Vol 1 Grundlagen, Editors F. Hensen, W. Knappe, H. Potente, 1989, pp. 3-7, ISBN.3-446-14339-4 (Vol 2 Extrusionsanlagen 1986, ISBN 3-446-14329-7). In embodiments herein, the screw length can range from 1 to 60 times the screw diameter, or from 35 to 48 times the screw diameters. The rotational speed of the screw may range from 10 to 600 rotations per minute (rpm), or from 25 to 300 rpm. The maximum throughput is dependent on the screw diameter, the rotational speed, and the driving force. The process of the present disclosure can also be carried out at a level lower than maximum throughput by varying the parameters mentioned or employing weighing machines delivering dosage amounts.

The multimodal polyethylene composition and the masterbatch may be reacted at a ratio of 60:40 to 99.9:0.1. All individual values and subranges are included and disclosed herein. For example, in some embodiments, the multimodal polyethylene composition and the masterbatch may be reacted at a ratio of 65:35 to 99.9:0.1, 65:35 to 99.9:0.1, 70:30 to 99.9:0.1, 75:25 to 99.9:0.1, 80:20 to 99.9:0.1, 85:15 to 99.9:0.1, 90:10 to 99.9:0.1, 95:5 to 99.9:0.1, 97:3 to 99.9:0.1, 95:5 to 99:1, or 97:3 to 99:1. The multimodal polyethylene composition and masterbatch may also be reacted such that the amount of masterbatch in the multimodal polyethylene composition ranges from 0.1 to 40 wt. All individual values and subranges are included and disclosed herein. For example, in some embodiments, the multimodal polyethylene composition and the masterbatch may be reacted such that the amount of masterbatch in the multimodal polyethylene composition ranges from 0.1 to 35 wt. %, 0.1 to 30 wt. %, 0.1 to 25 wt. %, 0.1 to 20 wt. %, 0.1 to 15 wt. %, 0.1 to 10 wt. %, 0.1 to 5 wt. %, 0.1 to 3 wt. %, 1 to 5 wt. %, or 1 to 3 wt. %.

The multimodal polyethylene composition and masterbatch are subjected to a temperature above the softening point of the polymers for a sufficient period of time such that the reaction between the multimodal polyethylene composition and the free radical generator can take place. In some embodiments, the multimodal polyethylene composition and masterbatch are subjected to a temperature of less than or equal to 280° C. All individual values and subranges from less than or equal to 280° C. are included herein and disclosed herein. For example, the temperature can be less than or equal to 280, 260, 250, 240, 220, 200, 180 or 160° C. In some embodiments, the temperature is from 120° C. to 280° C., 140° C. to 280° C., 160° C. to 280° C., 180° C. to 280° C., or 180° C. to 260° C. In an alternative embodiment, the temperature is from 200° C. to 260° C. It will be understood that the period of time necessary for reaction can vary as a function of the temperature, the amount of material to be reacted, and the type of equipment used. Under exemplary conditions, the time at which the temperature above the softening point of the polymers is maintained may be from 10 seconds to 30 minutes. All individual values and subranges are included herein and disclosed herein; for example, the time can be from a lower limit of 10 seconds, 20 seconds, 30 seconds, 1 minute, 5 minutes, 15, minutes or 25 minutes to an upper limit of 45 seconds, 3 minutes, 8 minutes, 10 minutes, 12 minutes, 15 minutes, 18 minutes, 20 minutes, 23 minutes, or 30 minutes. For example, the time can be in the range of from 10 seconds to 20 minutes, or in the alternative, the time can be in the range of from 10 seconds to 15 minutes, or in the alternative, the time can be in the range of from 10 seconds to 10 minutes, or in the alternative, the time can be in the range of from 20 seconds to 20 minutes, or in the alternative, the time can be in the range of from 15 minutes to 30 minutes.

Films

In some embodiments, the presently-disclosed embodiments relate to films formed from any of the presently-disclosed polyethylene compositions as described herein. In some embodiments, the film may be a blown film or a cast film. In embodiments, the film may be an extrusion coated film. In embodiments, the film may be a blown machine directed oriented film or a cast film tenter frame oriented film. In some embodiments, the film may be a monolayer film. The film, in some embodiments, may be a multilayer film. In some embodiments of multilayer films that include the presently-disclosed polyethylene compositions, a multilayer film may include a polyethylene composition of the present disclosure in a surface layer and/or in an inner layer. In embodiments, the presently-disclosed polyethylene compositions may be in a sealant layer of a multilayer film, where applying the multimodal polyethylene composition described herein to at least one surface of a substrate layer, thereby forms a sealant layer associated with the at least one surface of the substrate layer. The sealant layer may be applied to the substrate layer of a blown film or a cast film, for example, by a coextrusion process. In embodiments, the sealant layer may be directly applied to the substrate layer as an extrusion coating. A sealant layer may provide a heat-sealable surface. As used herein, a heat-sealable surface is a surface that may allow the surface of the film to be heat-sealed to another surface of the same film or to the surface of another film or substrate.

In one or more embodiments, the presently-disclosed polyethylene compositions may be blended with other polymers, such as other polyethylenes or even other non-polyethylene-based polymers. For example, the presently-disclosed polyethylene compositions may be blended with conventional polyethylene compositions such as, without limitation, LDPEs, LLDPEs, and/or HDPEs, known to those skilled in the art.

The amount of the modified polyethylene composition to use in films of the present embodiments can depend on a number of factors including, for example, whether the film is a monolayer or multilayer film, the other layers in the film if it is a multilayer film, the end use application of the film, and others.

Films of the present disclosure can have a variety of thicknesses. The thickness of the film can depend on a number of factors including, for example, whether the film is a monolayer or multilayer film, the other layers in the film if it is a multilayer film, the desired properties of the film, the end use application of the film, the equipment available to manufacture the film, and others. In some embodiments, a film of the present disclosure has a thickness of up to 10 mils. For example, the film can have a thickness from a lower limit of 0.25 mils, 0.5 mils, 0.7 mils, 1.0 mil, 1.75 mils, or 2.0 mils to an upper limit of 4.0 mils, 6.0 mils, 8.0 mils, or 10 mils. In embodiments, the film can have a thickness from 0.25 mils, to 2.0 mils, from 0.25 mils to 1.75 mils, from 0.25 mils to 1.0 mils, from 0.25 mils to 0.7 mils, from 0.25 mils to 0.5 mils, from 0.5 mils, to 2.0 mils, from 0.5 mils to 1.75 mils, from 0.5 mils to 1.0 mils, from 0.5 mils to 0.7 mils, from 0.7 mils, to 2.0 mils, from 0.7 mils to 1.75 mils, from 0.7 mils to 1.0 mils, from 1.0 mils, to 2.0 mils, from 1.0 mils to 1.75 mils, from 1.75 mils, to 2.0 mils, or any combinations.

In embodiments where the film comprises a multilayer film, the number of layers in the film can depend on a number of factors including, for example, the desired properties of the film, the desired thickness of the film, the content of the other layers of the film, the end use application of the film, the equipment available to manufacture the film, and others. A multilayer blown film can comprise up to 2, 3, 4, 5, 6, 7, 8, 9, 10, or 11 layers in various embodiments.

The modified polyethylene compositions, in some embodiments, can be used in more than one layer of the film. Other layers within a multilayer film of the present disclosure can comprise, in various embodiments, a polymer selected from the following: the presently-disclosed polyethylene compositions, a LLDPE, a VLDPE (a very low density polyethylene), a MDPE, a LDPE, a HDPE, a HMWHDPE (a high molecular weight HDPE), a propylene-based polymer, a polyolefin plastomer (POP), a polyolefin elastomer (POE), an olefin block copolymer (OBC), an ethylene vinyl acetate, an ethylene acrylic acid, an ethylene methacrylic acid, an ethylene methyl acrylate, an ethylene ethyl acrylate, an ethylene butyl acrylate, an isobutylene, a maleic anhydride-grafted polyolefin, an ionomer of any of the foregoing, or a combination thereof. In some embodiments, a multilayer film of the present disclosure can comprise one or more tie layers known to those of skill in the art.

In additional embodiments of the films described herein, other layers may be adhered to, for example, a polyethylene film by a tie layer (sometimes in addition to a barrier layer). A tie layer may be used to adhere layers of dissimilar materials. For example, a barrier layer comprising ethylene vinyl alcohol (EVOH) may be adhered to a polyethylene material by a tie layer (i.e. a tie layer comprising maleic anhydride grafted polyethylene). For example, the polyolefin film can further comprise other layers typically included in multilayer structures depending on the application including, for example, other barrier layers, structural or strength layers, sealant layers, other tie layers, other polyethylene layers, polypropylene layers, etc. In additional embodiments, a printed layer may be included that may be an ink layer, which is applied to the film, to show product details and other packaging information in various colors.

It should be understood that any of the foregoing layers can further comprise one or more additives as known to those of skill in the art such as, for example, antioxidants, ultraviolet light stabilizers, thermal stabilizers, slip agents, antiblocks, pigments or colorants, processing aids, cross-linking catalysts, flame retardants, fillers and foaming agents. In some embodiments, the modified polyethylene compositions comprise up to 5 weight percent of such additional additives. All individual values and subranges from 0 to 5 wt. % are included and disclosed herein; for example, the total amount of additives in the polymer blend can be from a lower limit of 0, 0.5, 1, 1.5, 2, or 2.5 wt. % to an upper limit of 1.5, 2, 2.5, 3, 3.5, 4, 4.5, or 5 wt. %. In embodiments, the total amount of additives in the polymer blend can be from 0 wt. % to 5 wt. %, 0 wt. % to 4.5 wt. %, 0 wt. % to 4 wt. %, 0 wt. % to 3.5 wt. %, 0 wt. % to 3 wt. %, 0 wt. % to 2.5 wt. %, 0 wt. % to 2 wt. %, 0 wt. % to 1.5 wt. %, 0 wt. % to 1 wt. %, 0 wt. % to 0.5 wt. %, 0.5 wt. % to 5 wt. %, 0.5 wt. % to 4.5 wt. %, 0.5 wt. % to 4 wt. %, 0.5 wt. % to 3.5 wt. %, 0.5 wt. % to 3 wt. %, 0.5 wt. % to 2.5 wt. %, 0.5 wt. % to 2 wt. %, 0.5 wt. % to 1.5 wt. %, 0.5 wt. % to 1 wt. %, 1 wt. % to 5 wt. %, 1 wt. % to 4.5 wt. %, 1 wt. % to 4 wt. %, 1 wt. % to 3.5 wt. %, 1 wt. % to 3 wt. %, 1 wt. % to 2.5 wt. %, 1 wt. % to 2 wt. %, 1 wt. % to 1.5 wt. %, 1.5 wt. % to 5 wt. %, 1.5 wt. % to 4.5 wt. %, 1.5 wt. % to 4 wt. %, 1.5 wt. % to 3.5 wt. %, 1.5 wt. % to 3 wt. %, 1.5 wt. % to 2.5 wt. %, 1.5 wt. % to 2 wt. %, 2 wt. % to 5 wt. %, 2 wt. % to 4.5 wt. %, 2 wt. % to 4 wt. %, 2 wt. % to 3.5 wt. %, 2 wt. % to 3 wt. %, 2 wt. % to 2.5 wt. %, 2.5 wt. % to 5 wt. %, 2.5 wt. % to 4.5 wt. %, 2.5 wt. % to 4 wt. %, 2.5 wt. % to 3.5 wt. %, 2.5 wt. % to 3 wt. %, 3 wt. % to 5 wt. %, 3 wt. % to 4.5 wt. %, 3 wt. % to 4 wt. %, 3 wt. % to 3.5 wt. %, 3.5 wt. % to 5 wt. %, 3.5 wt. % to 4.5 wt. %, 3.5 wt. % to 4 wt. %, 4 wt. % to 5 wt. %, 4 wt. % to 4.5 wt. %, or 4.5 wt. % to 5 wt. %, or any combinations of these ranges.

The presently-disclosed polyethylene compositions, according to some embodiments, can be incorporated into multilayer films and articles that are comprised primarily, if not substantially or entirely, of polyolefins, or more preferably, of polyethylene, in order to provide a film and article that is more easily recyclable. The polyethylene-based compositions of the present disclosure are particularly advantageous in proving films wherein the film is formed primarily from polyethylene. For example, a monolayer or multilayer film wherein the film primarily comprises polyethylene may have an improved recyclability profile in addition to other advantages that the usage of such polymers may provide. In some embodiments, the film comprises 90 wt. % or more polyethylene based on the total weight of the film. In other embodiments, the film comprises 91 wt. % or more, 92 wt. % or more, 93 wt. % or more, 94 wt. % or more, 95 wt. % or more, 96 wt. % or more, 97 wt. % or more, 98 wt. % or more, or 99 wt. % or more polyethylene based on the total weight of the film.

In some embodiments, the film comprising a layer formed from the presently-disclosed polyethylene compositions can be laminated to another film substrate. Substrates may include films comprising polyester, nylon, polypropylene, polyethylene, and combinations. For preferred recyclability substrates, a biaxially oriented polyethylene (BOPE) substrate, a machine direction oriented polyethylene (MDO) substrate, or a coextruded polyethylene film may be included in the laminate structure.

Films of the present disclosure, in some embodiments, can be corona treated and/or printed (e.g., reverse or surface printed) using techniques known to those of skill in the art.

In some embodiments, films of the present disclosure can be oriented, uniaxially (e.g., in the machine direction) or biaxially using techniques known to those of skill in the art.

In embodiments, a monolayer blown film formed from the polyethylene compositions comprised herein, having a thickness of two mils may have a Dart drop impact of at least 1000 grams when measured according to ASTM D1709 Method A. In additional embodiments, a monolayer blown film formed from the polyethylene composition and having a thickness of two mils may have a Dart drop impact of at least 1100 grams, at least 1200 grams, at least 1300 grams, at least 1400 grams, at least 1500 grams, at least 1600 grams, at least 1700 grams, at least 1800 grams, at least 1900 grams, or even at least 2000 grams when measured according to ASTM D1709 Method A.

Articles

Embodiments of the present disclosure also relate to articles, such as packages, formed from or incorporating polyethylene compositions of the present disclosure (i.e., through films incorporating polyethylene compositions of the present disclosure). Such packages can be formed from any of the modified polyethylene compositions of the present disclosure (i.e., through films incorporating polyethylene-based compositions of the present disclosure) described herein. Such packages formed from any of the modified polyethylene compositions of the present disclosure may be sealable by various sealing methods known in the art, such as heat seal methods.

Examples of such articles can include flexible packages, pouches, stand-up pouches, and pre-made packages or pouches. In some embodiments, multilayer films or laminates of the present disclosure can be used for food packages. Examples of food that can be included in such packages include meats, cheeses, cereal, nuts, snacks, juices, sauces, and others. Such packages can be formed using techniques known to those of skill in the art based on the teachings herein and based on the particular use for the package (e.g., type of food, amount of food, etc.).

Low heat seal initiation temperatures such as those provided by the polyethylene modified compositions of the present disclosure may be particularly desirable for automated packaging systems where the item being packaged is loaded into the package as it is being made. Lower heat seal initiation temperatures may be advantageous to increase packaging productivity by minimizing the time and energy needed to heat and cool a sealant. In the case of recyclable polyethylene packaging having an inner sealant layer that seals at a temperature significantly lower than that of the outside polyethylene layer may enable a broader range of temperatures to make heat sealed packages, which may often be referred to as the packaging heat seal window. Some examples of such automated packaging equipment are called vertical form fill and seal (VFFS) machines or horizontal form fill and seal (HFFS) machines.

Test Methods

Unless otherwise indicated herein, the following analytical methods are used in describing aspects of the present disclosure:

Melt Index

Melt indices $I_2$ (or $I_2$) and $I_{10}$ (or I10) of polymer samples were measured in accordance to ASTM D-1238 (method B) at 190° C. and at 2.16 kg and 10 kg load, respectively. Their values are reported in g/10 min.

Density

Samples for density measurement were prepared according to ASTM D4703. Measurements were made, according to ASTM D792, Method B, within one hour of sample pressing.

Melt Strength

Melt strength is measured at 190° C. using a Goettfert Rheotens 71.97 (Goettfert Inc.; Rock Hill, S.C.), barrel fed with a Goettfert Rheotester 2000 capillary rheometer equipped with a flat entrance angle (180 degrees) of length of 30 mm and diameter of 2 mm. The pellets are fed into the barrel (L=300 mm, Diameter=12 mm), compressed and allowed to melt for 10 minutes before being extruded at a constant piston speed of 0.265 mm/s, which corresponds to a wall shear rate of 38.2s 1 at the given die diameter. The extrudate passes through the wheel pairs, which are separated by 0.4 mm, of the Rheotens located at 100 mm below the die exit and is pulled by the wheels downward at an acceleration rate of 2.4 mm/s2. The force (in cN) exerted on the wheels is recorded as a function of the velocity of the wheels (mm/s). Melt strength is reported as the plateau force (cN) before the strand breaks.

ASTM D1709 Dart Drop

The film Dart Drop test determines the energy that causes plastic film to fail under specified conditions of impact by a free falling dart. The test result is the energy, expressed in terms of the weight of the missile falling from a specified height, which would result in failure of 50% of the specimens tested.

After the film is produce, it is conditioned for at least 40 hours at 23° C. (+/−2° C.) and 50% R.H (+/−5) as per ASTM standards. Standard testing conditions are 23° C. (+/−2° C.) and 50% R.H (+/−5) as per ASTM standards.

The test result is reported by Method A, which uses a 1.5" diameter dart head and 26" drop height. The sample thickness is measured at the sample center and the sample then clamped by an annular specimen holder with an inside diameter of 5 inches. The dart is loaded above the center of the sample and released by either a pneumatic or electromagnetic mechanism.

Testing is carried out according to the 'staircase' method. If the sample fails, a new sample is tested with the weight of the dart reduced by a known and fixed amount. If the sample does not fail, a new sample is tested with the weight of the dart increased by a known amount. After 20 specimens have been tested the number of failures is determined. If this number is 10 then the test is complete. If the number is less than 10 then the testing continues until 10 failures have been recorded. If the number is greater than 10, testing is continued until the total of non-failures is 10. The Dart drop strength is determined from these data as per ASTM D1709 and expressed in grams as the dart drop impact of Type A. All the samples analyzed were 2 mil thick.

Dynamic Mechanical Spectroscopy (DMS)

Resins are compression-molded into 3 mm thick×25 mm circular plaques at 350° F. (° C. for consistency), for five minutes, under 25,000 lbs, in air. The sample is then taken out of the press, and placed on a counter to cool.

A constant temperature frequency sweep is performed using a TA Instruments "Advanced Rheometric Expansion System (ARES)," equipped with 25 mm (diameter) parallel plates, under a nitrogen purge. The sample is placed on the plate, and allowed to melt for five minutes at 190° C. The plates are then closed to a gap of 2 mm, the sample trimmed (extra sample that extends beyond the circumference of the "25 mm diameter" plate is removed), and then the test is started. The method has an additional five minute delay built in, to allow for temperature equilibrium. The experiments are performed at 190° C. over a frequency range of 0.1 to 500 rad/s. The strain amplitude is constant at 10%.

Antioxidant Concentration

Antioxidants IRGANOX™ 1010, IRGANOX™ 1076, IRGAFOS™ 168, and tris(nonylphenyl) phosphite ("TNPP") were measured by reversed phase liquid chromatography (Agilent 1260 equipped with a Zorbax Eclipse XDB-C8, 5-μm particle, 4.6×12.5 mm guard column coupled to a Zorbax, Eclipse XDB-C8, 3.5μm particle, 4.6×50 mm column, and UV absorbance detection at a wavelength of 210 nm). Each polymer resin sample (1 g) was dissolved in 25 mL hot o-xylene followed by reprecipitation of the polymer either into 50 mL methanol (IRGANOX™ 1010, IRGANOX™ 1076, IRGAFOS™ 168), or 50 mL isopropanol (TNPP). After the polymer resin sample was allowed to settle, an aliquot of the supernatant was filtered (0.2μm PTFE syringe filter) into a 2 mL glass autosampler vial and the vial was capped with a Teflon lined crimp cap. The vials were placed in the LC autosampler for analysis in duplicate and the average concentration was reported. Quantitation was performed using an external standardization procedure based on peak areas.

Half-Life

The thermal decomposition of different free radical generators (FRGs), as a 10% w/w solution in $C_{20}H_{42}$ (eicosane), was investigated with a SensysEvo DSC instrument (Setaram, France) both under isothermal conditions and the temperature scanning mode. In order to obtain the rate law (kinetic parameters) of the thermal decomposition of the FRGs, the 10% w/w solutions of the FRG in $C_{20}H_{42}$ (eicosane) were measured under temperature scanning mode in the temperature interval from 75° C. to 350° C. at five different scanning rates, namely 1° C./min, 2.5° C./min, 5° C./min, 10° C./min, and 20° C./min, respectively. About 60 mg of sample (the 10% w/w of the FRG in eicosane) was loaded into 170 mL Al pans and placed into the DSC instrument at 75° C. (above the melting point of paraffin) under a nitrogen atmosphere (20 cc/min). After thermal equilibration, the temperature was scanned according to the above-mentioned temperature program and the thermograms were recorded. Exothermic peaks were recorded in the temperature intervals from 120° C. to 320° C. The amount of heat released, −ΔHr (J/g), is determined from the DSC curves for each specimen, which allows for calculation of the reaction progress/conversion with temperature. The kinetic parameters describing the decomposition rate law were determined both by isoconversional methods (using the AKTS Thermokinetic Software, AKTS AG, Switzerland) and the best fitting parameters according to the Sestak-Berggren autocatalytic model. The activation energy, $E_a$ (kJ/mol), and the apparent pre-exponential factor, 1η 4 (α)−/(a) (s$^{-1}$(−)) as a function of decomposition progress, a, are determined using the Friedman differential isoconversional method and the Ozawa integral isoconversional method. The general form of Sestak-Berggren equation is given below:

$$\frac{d\alpha}{dt} = A - exp^{-E_a/(RT)} \alpha^m (1-\alpha)^n$$

and the activation energy, $E_a$, the pre-exponential factor, A, and the reaction orders, m and n, in the above equation are determined by the best fitting method. The $E_a$, A, m, and n parameters can then be used to calculate the FRG half-life at any temperature using the AKTS Thermokinetic Software.

Decomposition Energy & Peak Decomposition Temperature

Differential Scanning calorimetry (DSC) was used to measure the decomposition energies and peak decomposition temperatures. The TA Instruments Q2000 DSC, equipped with an RCS (refrigerated cooling system) was used to perform this analysis. A 0.5-2 mg sample was placed in a glass capillary tube, weighed, and flame sealed under nitrogen while being kept cool using a "cold finger" device. Analysis was then performed to determine its thermal properties.

The thermal behavior of the sample was determined by ramping the sample temperature up to create a heat flow versus temperature profile. First, the sample was heated from 0° C. to 400° C., at a rate of 10° C./min. Next, the sample was cooled. The sample was then heated again (this is the "reheat" ramp) at a 10° C./minute heating rate. Both heating curves were recorded. The initial heat curve was analyzed by setting baseline points from the beginning to the end of thermal activity. The reheat was used to assist in the determination of integration start and end.

For the free radical generators, the peak temperature was recorded as well as the total decomposition energy by integration of the area between the curve of the first heat cycle and the baseline. If the decomposition is exothermic, then the area between the curve and the baseline is integrated as negative due to the fact that there is negative heat flow. That is, the sample generates heat. If the sample is endothermic such that it takes heat, then the area is integrated as a positive number.

The heat under the exotherm peak was divided by the purity to extrapolate to 100% pure radical generator.

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of $\epsilon$ vs. t, where c is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Gel Permeation Chromatography (GPC)

The chromatographic system consisted of a PolymerChar GPC-IR (Valencia, Spain) high temperature GPC chromatograph equipped with an internal IR5 infra-red detector (IR5). The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad \text{(EQ. 1)}$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at 120,000 Mw.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{PeakMax})}{\text{Peak Width at } \frac{1}{2} \text{ height}} \right)^2 \quad \text{(EQ. 2)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{onetenthheight} - RV_{Peakmax})}{(RV_{Peakmax} - \text{Front Peak } RV_{onetenthheight})} \quad \text{(EQ. 3)}$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i/M_{polyethylene_i})} \quad \text{(EQ. 4)}$$

$$Mw_{(GPC)} = \frac{\sum_i (IR_i * M_{polyethylene_i})}{\sum_i IR_i} \quad \text{(EQ. 5)}$$

$$Mz_{(GPC)} = \frac{\sum_i (IR_i * M_{polyethylene_i}^2)}{\sum_i (IR_i * M_{polyethylene_i})} \quad \text{(EQ. 6)}$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−0.5% of the nominal flowrate.

$$\text{Flowrate}_{(effective)} = \text{Flowrate}_{(nominal)} * (RV_{(FM\ Calibrated)}/RV_{(FM\ Sample)}) \quad \text{(EQ. 7)}$$

Improved Method for Comonomer Content Distribution Analysis (iCCD)

Improved method for comonomer content analysis (iCCD) was developed in 2015 (Cong and Parrott et al., WO2017040127A1). iCCD test was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 5 cm or 10 cm (length)×¼" (ID) stainless was installed just before IR-5 detector in the detector oven. Ortho-dichlorobenzene (ODCB, 99% anhydrous grade or technical grade) was used. Silica gel 40 (particle size 0.2~0.5 mm, catalogue number 10181-3) from EMD Chemicals was obtained (can be used to dry ODCB solvent before). The CEF instrument is equipped with an autosampler with N2 purging capability. ODCB is sparged with dried nitrogen (N2) for one hour before use. Sample preparation was done with autosampler at 4 mg/ml (unless otherwise specified) under shaking at 160° C. for 1 hour. The injection volume was 300 μl. The temperature profile of iCCD was: crystallization at 3° C./min from 105° C. to 30° C., the thermal equilibrium at 30° C. for 2 minute (including Soluble Fraction Elution Time being set as 2 minutes), elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm (length)×¼" (ID) stainless tubing. The column packing and conditioning were with a slurry method according to the reference (Cong, R.; Parrott, A.; Hollis, C.; Cheatham, M. WO2017040127A1). The final pressure with TCB slurry packing was 150 Bars.

Column temperature calibration was performed by using a mixture of the Reference Material Linear homopolymer polyethylene (having zero comonomer content, Melt index ($I_2$) of 1.0, polydispersity $M_w/M_n$ approximately 2.6 by conventional gel permeation chromatography, 1.0 mg/ml) and Eicosane (2 mg/ml) in ODCB. iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL. The reported elution peak temperatures were linearly fit to the linear equation y=−6.3515x.+101.00, where y represented elution temperature of iCCD and x represented the octene mole %, and $R^2$ was 0.978.

Molecular weight of polymer and the molecular weight of the polymer fractions was determined directly from LS detector (90 degree angle) and concentration detector (IR-5) according Rayleigh-Gans-Debys approximation (Striegel and Yau, Modern Size Exclusion Liquid Chromatogram, Page 242 and Page 263) by assuming the form factor of 1 and all the virial coefficients equal to zero. Integration windows are set to integrate all the chromatograms in the elution temperature (temperature calibration is specified above) range from 23.0 to 120° C.

The calculation of Molecular Weight (Mw) from iCCD includes the following four steps:

(1) Measuring the interdetector offset. The offset is defined as the geometric volume offset between LS with respect to concentration detector. It is calculated as the difference in the elution volume (mL) of polymer peak between concentration detector and LS chromatograms. It is converted to the temperature offset by using elution thermal rate and elution flow rate. A linear high density polyethylene (having zero comonomer content, Melt index ($I_2$) of 1.0, polydispersity $M_w/M_n$ approximately 2.6 by conventional gel permeation chromatography) is used. Same experimental conditions as the normal iCCD method above are used except the following parameters: crystallization at 10° C./min from 140° C. to 137° C., the thermal equilibrium at 137° C. for 1 minute as Soluble Fraction Elution Time, soluble fraction (SF) time of 7 minutes, elution at 3° C./min from 137° C. to 142° C. The flow rate during crystallization is 0.0 ml/min. The flow rate during elution is 0.80 ml/min. Sample concentration is 1.0 mg/ml.

(2) Each LS datapoint in LS chromatogram is shifted to correct for the interdetector offset before integration.

(3) Baseline subtracted LS and concentration chromatograms are integrated for the whole eluting temperature range of the Step (1). The MW detector constant is calculated by using a known MW HDPE sample in the range of 100,000 to 140,000 Mw and the area ratio of the LS and concentration integrated signals.

(4) Mw of the polymer was calculated by using the ratio of integrated light scattering detector (90 degree angle) to the concentration detector and using the MW detector constant.

Calculation of half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C.

Zero-Shear Viscosity Ratio (ZSVR)

ZSVR is defined as the ratio of the zero-shear viscosity (ZSV) of the branched polyethylene material to the ZSV of the linear polyethylene material at the equivalent weight average molecular weight (Mw-gpc) according to the following Equations 8 and 9:

$$ZSVR = \frac{\eta_{0B}}{\eta_{0L}} \quad (EQ.\ 8)$$

$$\eta_{0L} = 2.29 \times 10^{-15} M_{w-gpc}^{3.65} \quad (EQ.\ 9)$$

The ZSV value is obtained from creep test at 190° C. via the method described above. The Mw-gpc value is determined by the conventional GPC method (Equation 5 in the Conventional GPC method description). The correlation between ZSV of linear polyethylene and its Mw-gpc was established based on a series of linear polyethylene reference materials. A description for the ZSV-Mw relationship can be found in the ANTEC proceeding: Karjala, Teresa P., Sammler, Robert L., Mangnus, Marc A., Hazlitt, Lonnie G., Johnson, Mark S., Hagen, Charles M. Jr., Huang, Joe W. L., Reichek, Kenneth N., "Detection of low levels of long-chain branching in polyolefins", Annual Technical Conference—Society of Plastics Engineers (2008), 66th 887-891.

Dynamic Shear Rheology

Samples were compression molded at 190° C., for 6.5 minutes at pressure of 25000 lbs in air, and the plaques were subsequently allowed to cool down on lab bench. Plaque thickness was ~3 mm. Constant temperature frequency sweep measurements were performed on an ARES strain controlled parallel plate rheometer (TA Instruments) equipped with 25 mm parallel plates, under a nitrogen purge. For each measurement, the rheometer was thermally equilibrated for at least 30 minutes prior to zeroing the gap. The sample was placed on the plate and allowed to melt for five minutes at 190° C. The plates were then closed to 2 mm, the sample trimmed, and then the test was started. The method had an additional five minute delay built in, to allow for temperature equilibrium. The experiments were performed at 190° C. over a frequency range of 0.1-100 rad/s at five points per decade interval. The strain amplitude was constant at 10%. The stress response was analyzed in terms of amplitude and phase, from which the storage modulus (G'), loss modulus (G"), complex modulus (G*), dynamic complex viscosity ($\eta^*$), and tan ($\delta$) or tan delta were calculated.

Haze

Haze was measured based on ASTM D1003. Haze measures the percentage of luminous transmission which in passing through the specimen deviates from the incident beam by forward scattering. For the purpose of this method, only luminous flux deviating more than 2.5% on the average is considered haze.

EXAMPLES

Example 1

Preparation of Multimodal Polyethylene Compositions 1-5

Multimodal Polyethylene Compositions 1-5, which are described according to the one or more embodiments of the detailed description, were prepared by a method and utilizing the catalysts and reactors described below.

All raw materials (monomer and comonomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted with purified solvent and pressured to above reaction pressure. All reaction feed flows are measured with mass flow meters and independently controlled with computer automated valve control systems.

Figure 2:
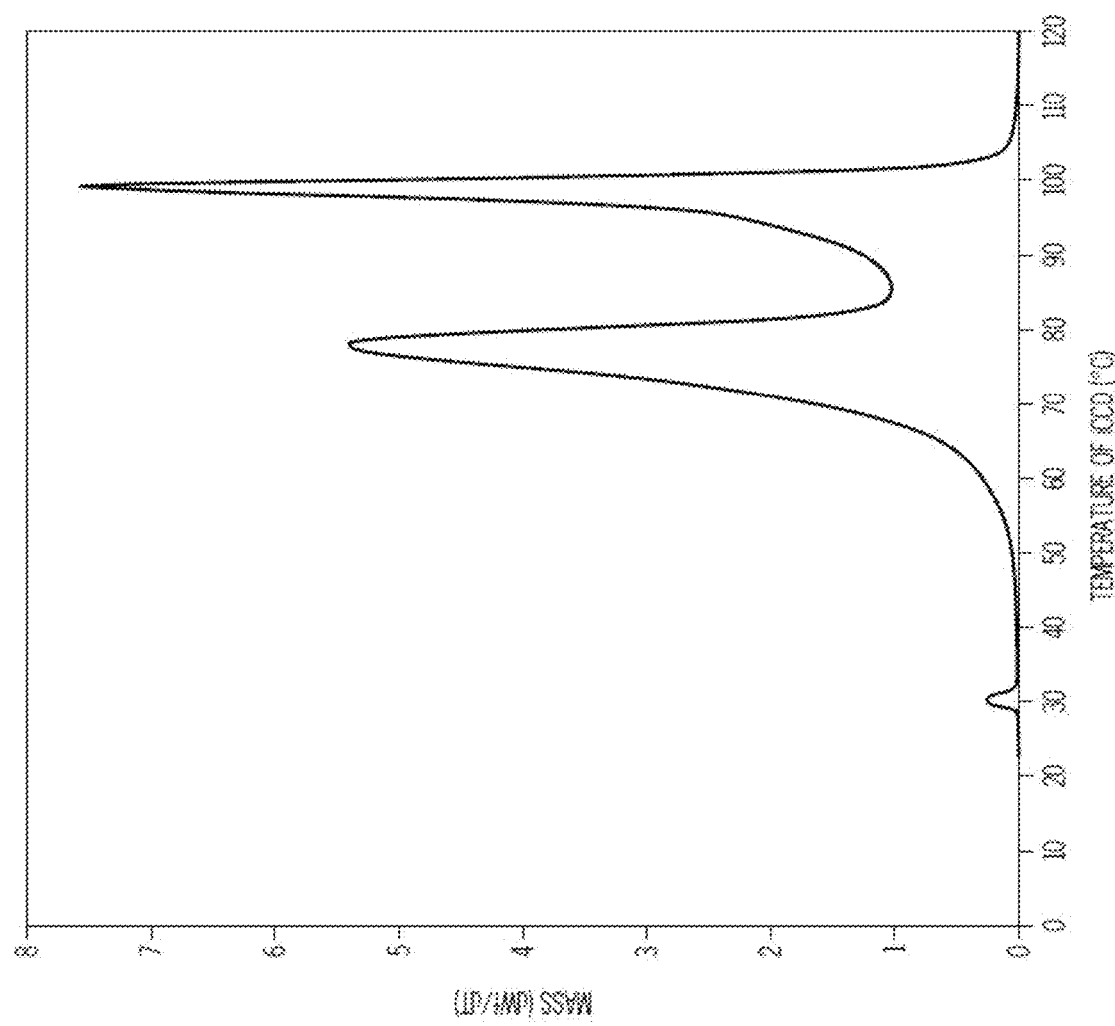
FIG. 2 graphically depicts the elution profile the multimodal polyethylene composition of Example 1, according to one or more embodiments presently described.

A two reactor system is used in a series configuration, as is depicted in FIG. 2. Each continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to each reactor (solvent, monomer, comonomer, and hydrogen) is temperature controlled to maintain a single solution phase by passing the feed stream through a heat exchanger. The total fresh feed to each polymerization reactor is injected into the reactor at two locations with approximately equal reactor volumes between each injection location. The fresh feed is controlled with each injector receiving half of the total fresh feed mass flow. The catalyst components are injected into the polymerization reactor through injection stingers. The primary catalyst component feed is computer controlled to maintain each reactor monomer conversion at the specified targets. The co-catalyst components are fed based on calculated specified molar ratios to the primary catalyst component. Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each reactor loop is provided by a pump.

In dual series reactor configuration the effluent from the first polymerization reactor (containing solvent, monomer, comonomer, hydrogen, catalyst components, and polymer) exits the first reactor loop and is added to the second reactor loop.

The second reactor effluent enters a zone where it is deactivated with the addition of and reaction with a suitable reagent (water). At this same reactor exit location other additives are added for polymer stabilization (typical antioxidants suitable for stabilization during extrusion and film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process.

The reactor stream feed data flows that correspond to the values in Table 1 used to produced the example are graphically described in FIG. 2. The data are presented such that the complexity of the solvent recycle system is accounted for and the reaction system can be treated more simply as a once through flow diagram. Table 2 shows the catalysts referenced in Table 1.

TABLE 1

|  |  | Multimodal Polyethylene Composition 1 | Multimodal Polyethylene Composition 2 | Multimodal Polyethylene Composition 3 | Multimodal Polyethylene Composition 4 | Multimodal Polyethylene Composition 5 |
| --- | --- | --- | --- | --- | --- | --- |
| Reactor Configuration | Type | Dual Series | Dual Series | Dual Series | Dual Series | Dual Series |
| Comonomer type | Type | 1-octene | 1-octene | 1-octene | 1-octene | 1-octene |
| First Reactor Feed Solvent/Ethylene Mass Flow Ratio | g/g | 5.2 | 5.3 | 6.6 | 5.2 | 5.3 |
| First Reactor Feed Comonomer/ Ethylene Mass Flow Ratio | g/g | 0.31 | 0.31 | 0.32 | 0.31 | 0.30 |
| First Reactor Feed Hydrogen/Ethylene Mass Flow Ratio | g/g | 7.9E−05 | 6.3E−05 | 6.2E−05 | 8.9E−05 | 5.4E−05 |
| First Reactor Temperature | °C. | 175 | 175 | 170 | 175 | 175 |
| First Reactor Pressure | barg | 50 | 50 | 50 | 50 | 50 |
| First Reactor Ethylene Conversion | % | 86.7 | 91.0 | 91.0 | 86.7 | 90.9 |
| First Reactor Catalyst Type | Type | Catalyst Component 1 | Catalyst Component 1 | Catalyst Component 1 | Catalyst Component 1 | Catalyst Component 1 |
| First Reactor Co-Catalyst 1 Type | Type | Co-Catalyst 1 | Co-Catalyst 1 | Co-Catalyst 1 | Co-Catalyst 1 | Co-Catalyst 1 |
| First Reactor Co-Catalyst 2 Type | Type | Co-Catalyst 2 | Co-Catalyst 2 | Co-Catalyst 2 | Co-Catalyst 2 | Co-Catalyst 2 |
| First Reactor Catalyst Metal | Type | Zr | Zr | Zr | Zr | Zr |
| First Reactor Co-Catalyst 1 to Catalyst Molar Ratio (B to Zr ratio) | Ratio | 2.4 | 1.1 | 1.2 | 1.5 | 1.5 |
| First Reactor Co-Catalyst 2 to Catalyst Molar Ratio (Al to Zr ratio) | Ratio | 23.7 | 55.0 | 45.0 | 15.8 | 11.5 |
| First Reactor Residence Time | min | 7.8 | 8.5 | 9.0 | 8.0 | 8.5 |
| Second Reactor Feed Solvent/ Ethylene Mass Flow Ratio | g/g | 2.4 | 2.1 | 2.5 | 2.5 | 2.1 |
| Second Reactor Feed Comonomer/ Ethylene Mass Flow Ratio | g/g | 0.148 | 0.068 | 0.063 | 0.086 | 0.061 |

TABLE 1-continued

|  |  | Multimodal Polyethylene Composition 1 | Multimodal Polyethylene Composition 2 | Multimodal Polyethylene Composition 3 | Multimodal Polyethylene Composition 4 | Multimodal Polyethylene Composition 5 |
|---|---|---|---|---|---|---|
| Second Reactor Feed Hydrogen/ Ethylene Mass Flow Ratio | g/g | 3.3E−04 | 1.1E−03 | 3.1E−04 | 3.1E−04 | 1.1E−03 |
| Second Reactor Temperature | °C. | 200 | 200 | 200 | 200 | 200 |
| Second Reactor Pressure | barg | 51 | 50 | 50 | 50 | 50 |
| Second Reactor Ethylene Conversion | % | 85.1 | 74.2 | 88.0 | 85.0 | 84.2 |
| Second Reactor Catalyst Type | Type | Catalyst Component 2 | Catalyst Component 2 | Catalyst Component 2 | Catalyst Component 2 | Catalyst Component 2 |
| Second Reactor Co-Catalyst 1 Type | Type | Co-Catalyst 1 | Co-Catalyst 1 | Co-Catalyst 1 | Co-Catalyst 1 | Co-Catalyst 1 |
| Second Reactor Co-Catalyst 2 Type | Type | Co-Catalyst 2 | Co-Catalyst 2 | Co-Catalyst 2 | Co-Catalyst 2 | Co-Catalyst 2 |
| Second Reactor Catalyst Metal | Type | Zr | Zr | Zr | Zr | Zr |
| Second Reactor Co-Catalyst 1 to Catalyst Molar Ratio (B to Metal ratio) | mol/mol | 1.1 | 10.0 | 6.7 | 13.3 | 17.1 |
| Second Reactor Co-Catalyst 2 to Catalyst Molar Ratio (Al to Metal ratio) | mol/mol | 1443.4 | >100.0 | >100.0 | >100.0 | >100.0 |
| Second Reactor Residence Time | min | 5.6 | 5.7 | 5.4 | 5.6 | 5.7 |
| Percentage of Total Ethylene Feed to First Reactor | wt % | 56.9 | 52.4 | 41.5 | 56.9 | 52.5 |

TABLE 2

| Catalyst component 1 | Zirconium, dimethyl[[2,2'''-[[bis[1-methylethyl)germylene]bis(methyleneoxy-kO)]bis[3'',5,5''-tris(1,1-dimethylethyl)-5'-octyl[1,1':3',1''-terphenyl]-2'-olato-kO]](2-)] |
|---|---|
| Catalyst component 2 | Zirconium, dimethyl [[2,2'''-[1,3-propanediylbis(oxy-kO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1'-biphenyl]-2-olato-kO]](2-)]- |
| Catalyst component 3 | Hafnium, [[2',2'''-[1,2-cyclohexanediylbis(methyleneoxy-.kappa.O)]bis[3-(9H-carbazol-9-yl)-5-methyl[1,1'-biphenyl]-2-olato-.kappa.O]](2-)]dimethyl- |
| Catalyst component 4 | Catalyst component 4 comprised a Ziegler-Natta type catalyst). The heterogeneous Ziegler-Natta type catalyst-premix was prepared substantially according to U.S. Pat. No. 4,612,300, by sequentially adding to a volume of ISOPAR E, a slurry of anhydrous magnesium chloride in ISOPAR E, a solution of EtAlCl2 in heptane, and a solution of Ti(O-iPr)4 in heptane, to yield a composition containing a magnesium concentration of 0.20M, and a ratio of Mg/Al/Ti of 40/12.5/3. An aliquot of this composition was further diluted with ISOPAR-E, to yield a final concentration of 500 ppm Ti in the slurry. While being fed to, and prior to entry into, the polymerization reactor, the catalyst premix was contacted with a dilute solution of Et3Al, in the molar Al to Ti ratio specified in Table XX, to give the active catalyst. |

TABLE 2-continued

| Co-catalyst 1 | bis(hydrogenated tallow alkyl)methylammonium tetrakis(pentafluorophenyl)borate(1-) |
|---|---|
| Co-catalyst 2 | modified methyl aluminoxane |
| Co-catalyst 3 | Tri-ethyl aluminum |

Example 2

Comparative Polyethylene Resins A-J

Comparative Compositions A-C were prepared by methods described herein below. Comparative Compositions D-F are bimodal polyethylene compositions that are generally prepared using the catalyst system and processes provided for preparing the Inventive First Compositions in PCT Publication No. WO 2015/200743. Comparative Compositions G-J are commercially available polyethylene compositions. Table 3 identifies the commercially available polyethylene compositions of Comparative Compositions G-J.

TABLE 3

| Sample Comparative Polyethylene Composition | Commercial Name (Company of Manufacture) |
|---|---|
| G | ELITE ™ 5400G (Dow Chemical Co.) |
| H | ELITE ™ 5111G (Dow Chemical Co.) |
| I | EXCEED 1012 (ExxonMobil) |
| J | EXCEED 1018 (ExxonMobil) |

The preparation of Comparative Compositions A-C are described as follows. All raw materials (monomer and comonomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted with purified solvent and pressured to above reaction pressure. All reaction feed flows are measured with mass flow meters and independently controlled with computer automated valve control systems.

A two reactor system is used in a series configuration. Each continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to each reactor (solvent, monomer, comonomer, and hydrogen) is temperature controlled to maintain a single solution phase by passing the feed stream through a heat exchanger. The total fresh feed to each polymerization reactor is injected into the reactor at two locations with approximately equal reactor volumes between each injection location. The fresh feed is controlled with each injector receiving half of the total fresh feed mass flow. The catalyst components are injected into the polymerization reactor through injection stingers. The primary catalyst component feed is computer controlled to maintain each reactor monomer conversion at the specified targets. The cocatalyst components are fed based on calculated specified molar ratios to the primary catalyst component. Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each reactor loop is provided by a pump.

In dual series reactor configuration the effluent from the first polymerization reactor (containing solvent, monomer, comonomer, hydrogen, catalyst components, and polymer) exits the first reactor loop and is added to the second reactor loop.

The second reactor effluent enters a zone where it is deactivated with the addition of and reaction with a suitable reagent (water). At this same reactor exit location other additives are added for polymer stabilization (typical antioxidants suitable for stabilization during extrusion and film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process.

Figure 3:
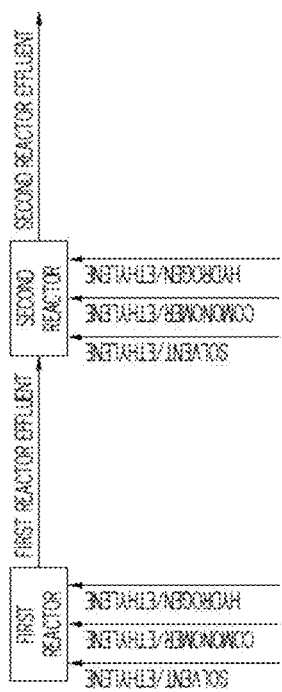
FIG. 3 schematically depicts a reactor system useful for producing polyethylene, according to one or more embodiments presently described.
Figure 4:
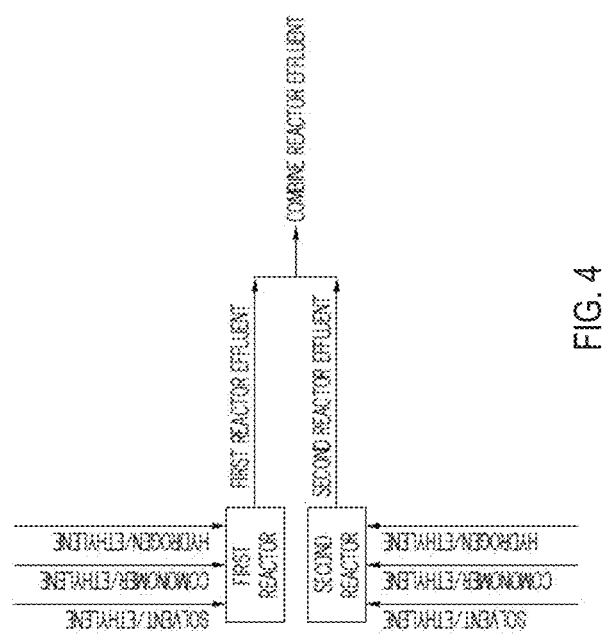
FIG. 4 schematically depicts another reactor system useful for producing polyethylene, according to one or more embodiments presently described.

The reactor stream feed data flows that correspond to the values in Table 4A used to produce the example are graphically described in FIG. 3. The data are presented such that the complexity of the solvent recycle system is accounted for and the reaction system can be treated more simply as a once through flow diagram. Table 1B shows the catalysts and co-catalysts shown in Table 4.

TABLE 4

| Polyethylene Composition | | Comparative Polyethylene Composition A | Comparative Polyethylene Composition B | Comparative Polyethylene Composition C |
|---|---|---|---|---|
| Reactor Configuration | Type | Dual Series | Dual Series | Dual Series |
| Comonomer type | Type | 1-octene | 1-octene | 1-octene |
| First Reactor Feed Solvent/ Ethylene Mass Flow Ratio | g/g | 5.5 | 5.1 | 5.3 |
| First Reactor Feed Comonomer/ Ethylene Mass Flow Ratio | g/g | 0.22 | 0.39 | 0.36 |
| First Reactor Feed Hydrogen/ Ethylene Mass Flow Ratio | g/g | 1.8E−04 | 1.0E−04 | 9.2E−05 |
| First Reactor Temperature | ° C. | 160 | 160 | 160 |
| First Reactor Pressure | barg | 50 | 50 | 50 |
| First Reactor Ethylene Conversion | % | 90.9 | 88.4 | 90.8 |
| First Reactor Catalyst Type | Type | Catalyst component 3 | Catalyst component 1 | Catalyst component 1 |
| First Reactor Co-Catalyst 1 Type | Type | Co-catalyst 1 | Co-catalyst 1 | Co-catalyst 1 |
| First Reactor Co-Catalyst 2 Type | Type | Co-catalyst 2 | Co-catalyst 2 | Co-catalyst 2 |
| First Reactor Catalyst Metal | Type | Hf | Zr | Zr |
| First Reactor Co-Catalyst 1 to Catalyst Molar Ratio (B to Metal ratio) | Ratio | 12.1 | 1.2 | 1.2 |
| First Reactor Co-Catalyst 2 to Catalyst Molar Ratio (Al to Metal ratio) | Ratio | 50.1 | 15.0 | 9.6 |
| First Reactor Residence Time | min | 17.4 | 7.6 | 8.0 |
| Second Reactor Feed Solvent/ Ethylene Mass Flow Ratio | g/g | 2.2 | 2.5 | 2.5 |

TABLE 4-continued

| Polyethylene Composition | | Comparative Polyethylene Composition A | Comparative Polyethylene Composition B | Comparative Polyethylene Composition C |
|---|---|---|---|---|
| Second Reactor Feed Comonomer/ Ethylene Mass Flow Ratio | g/g | 0.030 | 0.105 | 0.084 |
| Second Reactor Feed Hydrogen/ Ethylene Mass Flow Ratio | g/g | 1.4E−04 | 2.5E−04 | 2.5E−04 |
| Second Reactor Temperature | °C. | 195 | 190 | 190 |
| Second Reactor Pressure | barg | 52 | 51 | 51 |
| Second Reactor Ethylene Conversion | % | 89.1 | 82.9 | 83.7 |
| Second Reactor Catalyst Type | Type | Catalyst component 4 | Catalyst component 2 | Catalyst component 2 |
| Second Reactor Co-Catalyst 1 Type | Type | None | Co-catalyst 1 | Co-catalyst 1 |
| Second Reactor Co-Catalyst 2 Type | Type | Co-catalyst 3 | Co-catalyst 2 | Co-catalyst 2 |
| Second Reactor Catalyst Metal | Type | Ti | Zr | Zr |
| Second Reactor Co-Catalyst 1 to Catalyst Molar Ratio (B to Metal ratio) | mol/mol | n/a | 1.2 | 1.2 |
| Second Reactor Co-Catalyst 2 to Catalyst Molar Ratio (Al to Metal ratio) | mol/mol | 4.0 | 3950 | 3520 |
| Second Reactor Residence Time | min | 7.7 | 5.8 | 5.8 |
| Percentage of Total Ethylene Feed to First Reactor | wt % | 27.9 | 60.7 | 58.1 |

Example 3

Analysis of Sample Multimodal Polyethylene Compositions and Comparative Polyethylene Resins Polyethylene Compositions 1-6 of Examples 1A and 1B, Comparative Polyethylene Compositions A-C of Example 2, as well as commercially available Comparative Polyethylene Samples D-J of Example 2 were analyzed by iCCD. The iCCD data of Polyethylene Composition 5 is provided in FIG. 2. Additional data generated from the iCCD testing of all samples is provided in Tables 5A and 5B. Specifically, Tables 5A and 5B includes analysis of the iCCD data, including the areas of the respective first and second polyethylene fractions (45-87° C. and 95-120° C.). Additional data is also provided for each example composition including overall density, Dart strength (method A), melt index, weight average molecular weight in the second PE fraction. These properties are based on monolayer blown films consisting completely of each polyethylene sample.

To conduct dart testing as well as other testing based on formed films, 2 mil blown films were formed with the polyethylene samples. Specifically, monolayer blown films are produced via an Egan Davis Standard extruder, equipped with a semi grooved barrel of ID 3.5 inch; 30/1 L/D ratio; a barrier screw; and an Alpine air ring. The extrusion line has an 8 inch die with internal bubble cooling. The extrusion line also has a film thickness gauge scanner. The film fabrication conditions were: film thickness maintained at 2 mil (0.001 in or 0.0254 mm); blow up ratio (BUR) 2.5; die gap 70 mil; and frost line height (FLH) 37 inch. The output rate was constant at 260 lbs/hr.

TABLE 5A

| PE Sample | Overall Density (g/cm³) | Overall MI (g/10 min) | ZSVR | First PE fraction area (45-87° C.) (%) | Second PE fraction area (95-120° C.) (%) | First PE fraction area to Second PE fraction area ratio |
|---|---|---|---|---|---|---|
| 1 | 0.925 | 0.85 | 1.83 | 55.97% | 29.09% | 1.92 |
| 3 | 0.928 | 0.85 | 1.96 | 45.24% | 43.81% | 1.03 |
| 5 | 0.928 | 0.85 | 1.69 | 57.96% | 29.23% | 1.98 |
| 6 | 0.93 | 0.50 | — | 47.08% | 44.07% | 1.07 |
| A | 0.935 | 0.85 | 4.95 | 31.80% | 53.70% | 0.59 |
| B | 0.918 | 0.85 | 1.59 | 65.50% | 24.30% | 2.70 |
| C | 0.918 | 0.85 | 1.75 | 67.80% | 24.97% | 2.72 |
| D | 0.912 | 0.85 | 2.03 | 76.41% | 7.49% | 10.20 |
| E | 0.918 | 0.85 | 2.10 | 60.58% | 17.33% | 3.50 |
| F | 0.925 | 0.85 | 2.10 | 55.35% | 21.44% | 2.58 |
| G | 0.916 | 1.00 | 2.95 | 73.66% | 9.55% | 7.71 |
| H | 0.925 | 0.85 | 3.28 | 52.82% | 21.84% | 2.42 |
| I | 0.912 | 1.00 | — | 91.22% | 1.51% | 60.41 |
| J | 0.918 | 1.00 | 1.36 | 73.38% | 5.44% | 13.49 |

TABLE 5B

| PE Sample | Mw of second PE fraction (g/mol) | Overall polyethylene composition MWD | Dart A (g) | MD Tear (gf) | FWHM (° C.) | First PE fraction melt index (g/10 min) |
|---|---|---|---|---|---|---|
| 1 | 60444 | 3.5 | 1200 | 252 | 4 | 0.15 |
| 3 | 61805 | 3.5 | 1000 | 168 | 2.8 | 0.1 |
| 5 | 45684 | 4.6 | 1800 | 226 | 3.2 | 0.15 |
| 6 | 54882 | 4 | 2200 | 144 | 2.8 | 0.05 |
| A | 119731 | 3.9 | 300 | 103 | 4.2 | 0.1 |
| B | 65836 | 2.8 | 2200 | 303 | 3 | 0.28 |
| C | 72441 | 2.8 | 1800 | 324 | 2.8 | 0.3 |
| D | 96844 | 3.8 | 2000 | — | — | 0.2 |
| E | 107698 | 3.8 | 1700 | 292 | — | 0.2 |
| F | 95477 | 3.5 | 700 | 214 | 10.6 | 0.15 |
| G | 126779 | 3.9 | 1200 | — | — | — |
| H | 114384 | 3.7 | 400 | — | — | — |
| I | 73300 | 2.4 | 1800 | — | — | — |
| J | 91878 | 2.5 | 1200 | — | — | — |

The results show that no comparative example compositions display comparable dart strengths at overall densities of at least 0.924 g/cm³. For example, some comparative examples have high dart strength, but these samples have much lower density. Higher density comparative samples (e.g., 0.924 g/cm³ to 0.936 g/cm³) display much lower dart strength (e.g., less than 1000 grams).

Additionally, several compositions of Example 1 had Dow Rheology Indexes of less than 10, such as 3.5, 4.6, and 5.5.

Example 4

Polyethylene Formulation 1 and Comparative Polyethylene Formulations A-F

Table 7 identifies the polyethylene formulations whose reactions products produced Sample 1 and Comparative Samples A-F. Additionally, as shown in Table 7, Sample 1 and Comparative Samples C and E all included 3 wt. % of the free radical generator masterbatch ("FRG MB"), and Sample 2 and Comparative Samples G and H all included 2 wt. % of the FRG MB. The FRG MB was produced by adding a solution of 2.44 parts of Trigonox 301 (41% solution of active peroxide in isoparaffins, available from AkzoNobel) in 2.44 parts of Isopar M to 1000 parts of AGILITY™ 7080 polyethylene pellets available from Dow Chemical Co., in a high speed mixer vessel. The mixture was then stirred for 10 minutes at 1000 rpm to disperse the liquid peroxide solution over the pellets. The final FRG MB had 1000 ppm active peroxide.

TABLE 7

| Sample 1 | 97 wt. % Multimodal Polyethylene Composition 5 |
| | 3 wt. % FRG MB |

TABLE 7-continued

| Sample 2 | 98 wt. % Multimodal Polyethylene Composition 5 |
| | 2 wt. % FRG MB |
| Comparative Sample A | 100 wt. % Multimodal Polyethylene Composition 5 |
| Comparative Sample B | 100 wt. % ELITE ™ 5111 (Dow Chemical Co.) |
| Comparative Sample C | 97 wt. % ELITE ™ 5111 (Dow Chemical Co.) |
| | 3 wt. % FRG MB |
| Comparative Sample D | 100 wt. % INNATE ™ ST70 (Dow Chemical Co.) |
| Comparative Sample E | 97 wt. % INNATE ™ ST70 (Dow Chemical Co.) |
| | 3 wt. % FRG MB |
| Comparative Sample F | 100 wt. % ENABLE ™ 2705 (Dow Chemical Co.) |
| Comparative Sample G | 98 wt. % DOWLEX ™ NG2045B (Dow Chemical Co.) |
| | 2 wt. % FRG MB |
| Comparative Sample H | 98 wt. % DOWLEX ™ 2045G (Dow Chemical Co.) |
| | 2 wt. % FRG MB |

Samples 1-2 and Comparative Samples A-H were analyzed by iCCD. The iCCD data generated from the iCCD testing of all samples is provided in Table 8. Specifically, Tables 8 includes analysis of the iCCD data, including the areas of the respective first and second polyethylene fractions (45-87° C. and 95-120° C.). Additional data is also provided for each example composition including overall melt index, ZSVR, $M_z$, higher density fraction molecular weight, and FWHM. As shown in Table 8, the FWHM of Comparative Samples B and C were too broad to calculate.

TABLE 8

| | Overall density (g/cm³) | Overall MI (g/10 min) | ZSVR | First PE fraction area (45-87° C.) | Second PE fraction area (95-120° C.) | First PE fraction area to Second PE fraction area ratio | Mz (Absolute GPC) | Higher density fraction Mwt. | FWHM |
|---|---|---|---|---|---|---|---|---|---|
| Sample 1 | 0.68 | | | 59.31% | 26.06% | 2.28 | 506404 | 44865 | 5 |
| Compara. Sample A | 0.82 | 0.928 | 1.55 | 58.72% | 27.12% | 2.16 | 365967 | 41684 | 5 |

TABLE 8-continued

| | Overall density (g/cm³) | Overall MI (g/10 min) | ZSVR | First PE fraction area (45-87° C.) | Second PE fraction area (95-120° C.) | First PE fraction area to Second PE fraction area ratio | Mz (Absolute GPC) | Higher density fraction Mwt. | FWHM |
|---|---|---|---|---|---|---|---|---|---|
| Compara. Sample B | 0.84 | 0.925 | | 50.88% | 24.26% | 2.10 | 444324 | 107240 | To broad to calc. |
| Compara. Sample C | 0.47 | | | 51.38% | 23.99% | 2.14 | 1199440 | 116774 | To broad to calc. |
| Compara. Sample D | 0.88 | 0.925 | 1.82 | 55.06% | 21.89% | 2.51 | 573642 | 91901 | 10.8 |
| Compara. Sample E | 0.53 | | | 55.38% | 21.85% | 2.53 | 1232846 | 100935 | 10.8 |
| Compara. Sample F | 0.54 | 0.927 | | 35.43% | 1.75% | 20.21 | 212262 | 136937 | No peak |

The low-shear viscosity (eta at 0.1 rad/s), high-shear viscosity (eta at 500 rad/s), viscosity ratio at 0.1 rad/s to 500 rad/s, ratio of G' at 250 rad/s to G' at 0.1 rad/s, and crossover frequency for each of Sample 1-2 and Comparative Samples A-H are provided in Table 9.

TABLE 9

| | Eta at 0.1 rad/s | Eta at 500 rad/s | Viscosity ratio at 0.1 rad/s to 500 rad/s | Tan delta ratio at 0.1 rad/s to 500 rad/s | Ratio of G' at 250 rad/s to G' at 0.1 rad/s | G' and G" Crossover Frequency (rad/s) |
|---|---|---|---|---|---|---|
| Sample 1 | 14713 | 525 | 28.01 | 8.18 | 5.32E+02 | 33.5 |
| Sample 2 | 13079 | 515 | 25.39 | 8.66 | 6.34E+02 | 39 |
| Comparative Sample A | 11142 | 540 | 20.64 | 13.56 | 1.18E+03 | 40 |
| Comparative Sample B | 13083 | 664 | 19.72 | 5.36 | 5.59E+02 | N/a |
| Comparative Sample C | 25863 | 647 | 39.97 | 3.33 | 1.79E+02 | N/a |
| Comparative Sample D | 10730 | 647 | 16.60 | 9.52 | 1.13E+03 | 82.5 |
| Comparative Sample E | 18795 | 644 | 29.18 | 4.95 | 3.43E+02 | 52.8 |
| Comparative Sample F | 25023 | 691 | 36.19 | 3.20 | 1.93E+02 | 100.4 |
| Comparative Sample G | 25634 | 684 | 37.48 | 3.45 | 1.95E+02 | 50 |
| Comparative Sample H | 14089 | 654 | 21.55 | 5.86 | 5.47E+02 | 80 |

As shown in Table 9, the low-shear viscosity (eta at 0.1 rad/s) of all samples was improved by the addition of the FRG MB relative to the neat samples, which is shown in the comparison of 14713 Pa·s for Sample 1 (includes FRG MB) compared to 11142 Pa·s for Comparative Sample A (neat), 13083 Pa·s for Comparative Sample B (neat) compared to 25863 Pa·s for Comparative Sample C (includes FRG MB), and 10730 Pa·s for Comparative Sample D (neat) compared to 18795 Pa·s for Comparative Sample E (including FRG MB).

Also regarding the high-shear viscosity (eta at 500 rad/s), the addition of the FRG MB into the compositions did not significantly alter the high-shear viscosity. Also, both Sample 1 and Sample 2, each containing Multimodal Polyethylene Composition 5, exhibited lower high-shear viscosity than the Comparative Samples A-H.

Finally, Table 9 shows the storage and loss moduli crossover points for Sample 1, Comparative Sample A, Comparative Sample D, and Comparative Sample F. The crossover angle was much lower for Sample 1 and Comparative Sample A when compared to than either Comparative Sample D or Comparative Sample F. The lower crossover frequency was indicative of increased levels of branching via the addition of the FRG MB.

Figure 5:
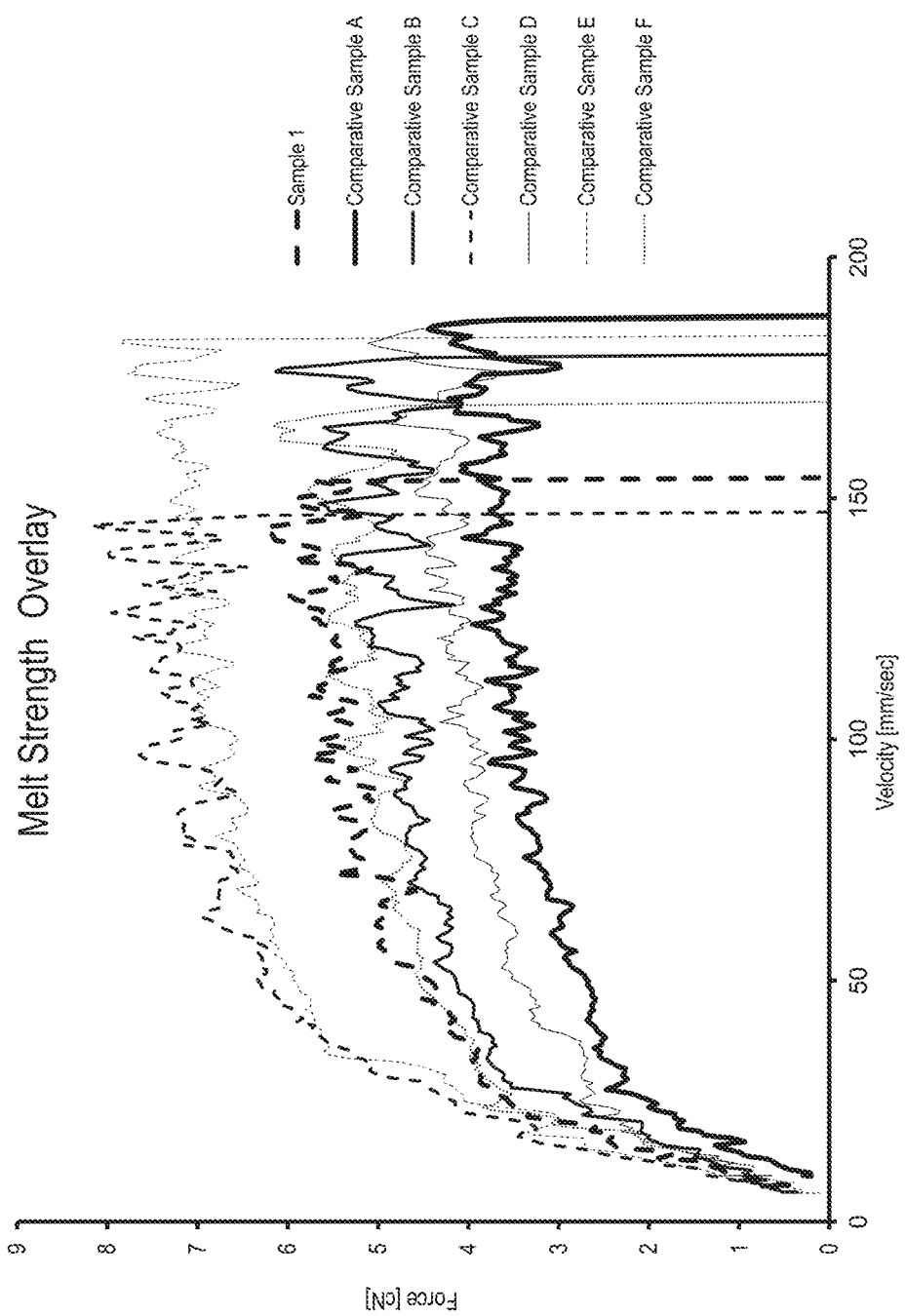
FIG. 5 graphically depicts a comparison of the melt strength of a multimodal polyethylene composition, according to one or more embodiments presently-described, with Comparative Samples A-F.

Referring now to FIG. 5, a comparison of the melt strength curves for Sample 1 with Comparative Samples A-F is graphically depicted. As shown in FIG. 5, the melt strength curves of the samples that included the FRG MB (Sample 1, Comparative Sample C, Comparative Sample E, and Comparative Sample F) were generally higher than the samples that did not include FRG MB.

Example 5

Analysis of Film Properties of Modified Polyethylene Composition 1 and Comparative Polyethylene Compositions A-F In this Example, Sample Films 1-2 and Comparative Film Samples A-H were produced from Samples 1-2 and Comparative Samples A-H, respectively. The films were 2 mil film samples made on a 1994 Gloucester Line A blown film line, using a 3.5" semi-groove barrel screw. The blow-up ratio was set to 2.5, and temperatures were set to 350 at the feed end and 440 at the die. The MB was dry-blended at line for all samples whose formulations comprised FRG MB.

The average screen pressure, average melt temperature, dart drop impact, average MD Elmendorf tear, puncture average peak load, and average haze for each of Sample Films 1-2 and Comparative Film Samples A-H are provided in Table 10.

TABLE 10

|  | Average Screen Pressure (kPa) | Average Melt Temp. (° C.) | Dart Drop Impact (g) | Average MD Elmendorf Tear (gf) | Puncture Average Peak Load (lbf) | Average Haze (%) |
|---|---|---|---|---|---|---|
| Sample Film 1 | 4683 | 447.8 | 1680 | 109.788 | 19.25 | 24.74 |
| Compara. Sample Film A | 4785 | 448.5 | 2125 | 152.038 | 16.78 | 55.44 |
| Compara. Sample Film B | 5037 | 439.9 | 652 | 217.051 | 18.86 | 18.7 |
| Compara. Sample Film C | 5172 | 442 | 489 | 173.865 | 20.57 | 20.46 |
| Compara. Sample Film D | 5253 | 444.9 | 1101 | 215.917 | 20.85 | 18.7 |
| Compara. Sample Film E | 5126 | 445.6 | 789 | 214.268 | 21.05 | 18.82 |
| Compara. Sample Film F | 4897 | 438 | 279 | 105.949 | 18.22 | 14.6 |

As shown in Table 10, the presence of the FRG MB did not appear to affect the screen pressure by an appreciable amount, which can be observed by comparing the average screen pressure of 4683 kPa for Sample 1 compared to 4785 kPa for Comparative Sample A, 5037 kPa for Comparative Sample B compared to 5172 kPa for Comparative Sample C, and 5253 kPa for Comparative Sample D compared to 5126 kPa for Comparative Sample E. Furthermore, Sample 1 exhibited an improved average haze (24.74%) when compared to Comparative Sample A (55.44%), while Comparative Sample C exhibited an inferior average haze (20.46%) when compared to Comparative Sample B (18.7%) and Comparative Sample E exhibited an inferior average haze (18.82%) when compared to Comparative Sample D (18.7%).

It will be apparent that modifications and variations are possible without departing from the scope of the disclosure defined in the appended claims. More specifically, although some aspects of the present disclosure are identified herein as preferred or exemplary or particularly advantageous, it is contemplated that the present disclosure is not necessarily limited to these aspects.

It is noted that one or more of the following claims utilize the term "wherein" as a transitional phrase. For the purposes of defining the presently described embodiments, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A polyethylene formulation comprising:
   a free radical generator; and
   a multimodal polyethylene composition comprising
      a peak in a temperature range of 95° C. to 120° C. in the elution profile via improved comonomer composition distribution (iCCD) analysis method, wherein a polyethylene fraction area is an area in the elution profile beneath the peak of the polyethylene fraction between 95° C. and 120° C., and wherein the polyethylene fraction area comprises at least 20% of the total area of the elution profile;
      a molecular weight ($M_w$) of less than 80,000 g/mol in the temperature range of from 95° C. to 120° C. on an elution profile via iCCD analysis method;
   wherein the multimodal polyethylene composition has a density of from 0.924 g/cm$^3$ to 0.936 g/cm$^3$ and a melt index ($I_2$) of from 0.25 grams/10 minutes (g/10 min) to 2.0 g/10 min.

2. The polyethylene formulation of claim 1, wherein the free radical generator has a half-life at 220° C. of less than 200 seconds, and a decomposition energy higher than −250 kJ/mol.

3. The polyethylene formulation of claim 1, wherein the multimodal polyethylene composition has a molecular weight ($M_w$) of from 5,000 g/mol to 80,000 g/mol in the temperature range of from 95° C. to 120° C. on an elution profile via improved comonomer composition distribution (iCCD) analysis method.

4. The polyethylene formulation of claim 1, wherein the free radical generator is a cyclic peroxide.

5. A method for producing the polyethylene formulation of claim 1, the method comprising: reacting the multimodal polyethylene composition with the free radical generator to form a modified polyethylene composition.

6. The method of claim 5, wherein the free radical generator is present in a masterbatch composition and wherein the masterbatch composition further comprises a carrier resin, the carrier resin having a density ranging from 0.900 g/cm$^3$ to 0.970 g/cm$^3$ and a melt index ranging from 0.01 g/10 min to 100 g/10 min.

7. The method of claim 5, wherein the reacting of the multimodal polyethylene composition with the free radical generator takes place in an extruder.

8. A modified polyethylene composition comprising:
a peak in a temperature range of 95° C. to 120° C. in the elution profile via improved comonomer composition distribution (iCCD) analysis method, wherein a polyethylene fraction area is an area in the elution profile beneath the peak of the polyethylene fraction between 95° C. and 120° C., and wherein the polyethylene fraction area comprises at least 20% of the total area of the elution profile;
a molecular weight ($M_w$) of less than 80,000 g/mol in the temperature range of from 95° C. to 120° C. on an elution profile via iCCD analysis method; and
wherein the modified polyethylene composition has a viscosity of less than 600 Pa·s, when measured at a frequency of 500 rad/s; and
wherein the modified polyethylene composition is multimodal.

9. The modified polyethylene composition of claim 8, wherein the modified polyethylene composition has a crossover frequency of less than 60 rad/sec.

10. The modified polyethylene composition of claim 8, wherein the modified polyethylene composition tan delta ratio of from 5 to 20, when measured using the DMS frequency swap test methods at 0.1 rad/sec per tan delta at 500 rad/sec.

11. The modified polyethylene composition of claim 8, wherein the modified polyethylene composition has a $M_{z(GPC)}/M_{w(GPC)}$ of from 2.5 to 20 when measured by light-scattering gel permeation chromatography GPC.

12. The modified polyethylene composition of claim 8, wherein the modified polyethylene composition has an $M_{z(GPC)}$ of at least 250,000 g/mol when measured by light-scattering GPC.

13. A polyethylene formulation comprising:
a free radical generator; and
a multimodal polyethylene composition comprising:
(a) a first polyethylene fraction having a single peak in a temperature range of 45° C. to 87° C. in an elution profile via improved comonomer composition distribution (iCCD) analysis method, wherein a first polyethylene fraction area is an area in the elution profile beneath the single peak of the first polyethylene fraction between 45° C. and 87° C.; and
(b) a second polyethylene fraction having a single peak in a temperature range of 95° C. to 120° C. in the elution profile via iCCD analysis method and wherein a second polyethylene fraction area is an area in the elution profile beneath the single peak of the second polyethylene fraction between 95° C. and 120° C.;
wherein the polyethylene composition has a density of 0.924 g/cm³ to 0.936 g/cm³ and a melt index ($I_2$) of 0.25 g/10 minutes to 2.0 g/10 minutes, wherein the first polyethylene fraction area comprises at least 40% of the total area of the elution profile, wherein a ratio of the first polyethylene fraction area to the second polyethylene fraction area is 0.75 to 2.5, and wherein the width of the first peak of the second polyethylene fraction at 50 percent peak height is less than 5.0° C.

14. The polyethylene formulation of claim 13, wherein the free radical generator has a half-life at 220° C. of less than 200 seconds and a decomposition energy higher than −250 kJ/mol; and
the free radical generator is present in a masterbatch composition comprising a carrier resin, wherein the carrier resin has a density ranging from 0.900 g/cm³ to 0.970 g/cm³ and a melt index ranging from 0.01 g/10 min to 100 g/10 min.

15. The polyethylene formulation of claim 13, wherein the first polyethylene fraction has a melt index ($I_2$) of 0.01 g/10 minutes to 0.18 g/10 minutes.

* * * * *